United States Patent
Watanabe et al.

(10) Patent No.: US 7,088,266 B2
(45) Date of Patent: Aug. 8, 2006

(54) MAP IMAGE DISPLAY DEVICE

(75) Inventors: Masaki Watanabe, Yokohama (JP); Fumio Seto, Yokosuka (JP); Okihiko Nakayama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 413 days.

(21) Appl. No.: 10/648,251

(22) Filed: Aug. 27, 2003

(65) Prior Publication Data

US 2004/0080434 A1 Apr. 29, 2004

(30) Foreign Application Priority Data

Oct. 18, 2002 (JP) .............................. 2002-304444

(51) Int. Cl.
*G08G 1/123* (2006.01)

(52) U.S. Cl. ............ 340/995; 340/995.15; 340/995.16; 340/995.17; 340/995.26; 340/995.28; 701/202; 701/211

(58) Field of Classification Search .................. None
See application file for complete search history.

(56) References Cited

U.S. PATENT DOCUMENTS

| | | | |
|---|---|---|---|
| 4,737,927 A * | 4/1988 | Hanabusa et al. .......... 701/200 |
| 5,617,319 A * | 4/1997 | Arakawa et al. ............ 701/207 |
| 5,754,430 A * | 5/1998 | Sawada ..................... 701/209 |
| 5,821,880 A * | 10/1998 | Morimoto et al. ..... 340/995.21 |
| 5,908,465 A * | 6/1999 | Ito et al. .................... 701/211 |
| 6,011,494 A * | 1/2000 | Watanabe et al. ...... 340/995.14 |
| 6,462,676 B1 * | 10/2002 | Koizumi .................. 340/995.1 |
| 6,477,461 B1 * | 11/2002 | Tanaka et al. ............. 701/209 |
| 2005/0049780 A1 * | 3/2005 | Friedrichs et al. .......... 701/201 |

FOREIGN PATENT DOCUMENTS

JP 07-319383 A 12/1995

* cited by examiner

*Primary Examiner*—Benjamin C. Lee
*Assistant Examiner*—Son Tang
(74) *Attorney, Agent, or Firm*—Global IP Counselors, LLP

(57) ABSTRACT

A map image display device is configured and arranged to improve operability by enabling a map image of a location distant from a currently displayed map image to be appropriately displayed with a simple operation. The map image display device displays names that are subject to a user's input command superimposed on a map image, and, if one of the displayed names is specified, switches the map image to be displayed to a map image in the vicinity of the specified name. At this time, the map image display device selects as the name to be superimposed on the map image at least one distant map name that is not included in the map image to be displayed, and displays that selected distant map name superimposed in the map image peripheral part corresponding to the bearing from the center of the map image to be displayed.

18 Claims, 12 Drawing Sheets

MAP IMAGE DISPLAY DEVICE

BACKGROUND OF THE INVENTION

1. Field of the Invention

The present invention relates to a map image display device using a map image display program ideally suited to, for example, an in-vehicle navigation device.

2. Background Information

In-vehicle navigation devices are widely used to support comfortable vehicular travel. An in-vehicle navigation device generally has a map image display function, which functions by determining the map image to be displayed based on an input command by the user or based on the vehicle's present position, and route guidance and the like for the vehicle while displaying both the map image and names, such as location names and facility names.

In addition, as an example of an in-vehicle navigation device with improved operability, voice input-type in-vehicle navigation devices that can input user commands by voice have been developed and commercialized in recent years. As an example of such a voice input-type in-vehicle navigation device, a device has been proposed that sets the target vocabulary for voice recognition to names such as location names and facility names displayed on a map image, and, when the user utters one of these names, switches the map image to be displayed to a map image (enlarged image) in the vicinity of that name (for example, refer to Japanese Laid Open Patent Application No. 7-319383).

In view of the above, it will be apparent to those skilled in the art from this disclosure that there exists a need for an improved map image display device. This invention addresses this need in the art as well as other needs, which will become apparent to those skilled in the art from this disclosure.

SUMMARY OF THE INVENTION

It has been discovered that in the in-vehicle navigation device disclosed in above mentioned publication that the displays superimposed on a map image only names like location names and facility names included in the map image to be displayed, and sets the target vocabulary for the voice recognition function to these names. Consequently, this prior art has a problem in that, if it is desired to display a map image of a location distant from the map image currently being displayed, then operation is complicated because it is necessary to repetitively display a wide area, update the map image to be displayed any number of times, acquire the desired location within the map image, and then display the desired map image by uttering the name superimposed on that map image. Furthermore, this type of problem is not limited to a voice input-type in-vehicle navigation device. For example, this problem also arises even when redisplaying the desired map image by operating a touch panel, and the like.

The present invention was conceived to solve the problems of the prior art mentioned above, and therefore has an object to provide a map image display device and map image display program that can appropriately display, with simple operation, the map image of a location distant from the map image currently being displayed.

In view of the above, a map image display device is provided that basically comprises an input unit, a display unit and a control unit. The input unit is configured to input user commands. The display unit is configured to display map images. The control unit is operatively coupled to the display unit to display on the display unit a current displayed map image with at least one user selectable distant map name corresponding to a distant location that is not located in the current displayed map image. The control unit being configured to switch from the current displayed map image to a new displayed map image in response to a user input command such that the new displayed map image represents an area including the distant location corresponding to the distant map name selected by the user input command.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
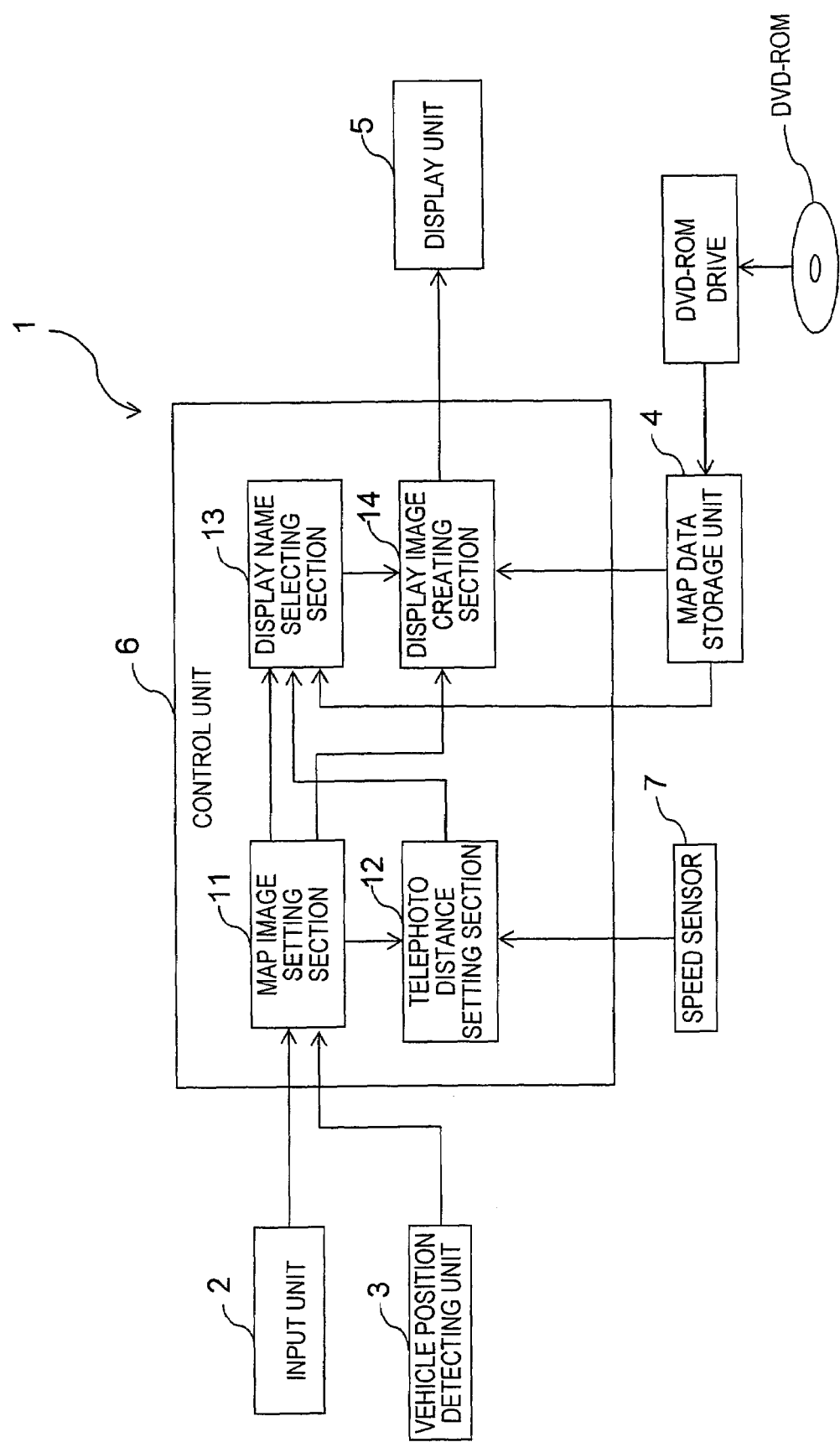
FIG. 1 is a block diagram that shows a schematic configuration of the in-vehicle navigation device including a map image display device with a map image display device program in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The following explains the details of an embodiment of the present invention, referencing the drawings. An overview of the present invention will first be explained. The present invention is constituted so that, if a map image to be displayed is determined in response to a user's input command, current vehicle location or the like, then intra-map names such as location names and facility names included in the current displayed map image are appropriately selected and superimposed at the proper location on the map image. Further, at least one distant name, such as location names and facility names, not included in the current displayed map image that corresponds to a distant position is selected to be displayed, and the selected distant name is superimposed at a position on the map image peripheral part corresponding to the bearing from the center of the map image. Furthermore, the user selectable names superimposed on the map image are available for the user to select by a user input command to display a new map image. Thus, if any one of these user selectable names is specified by the user, then the current displayed map image is switched to a new map image in the vicinity of the user selectable name that was specified by the user. The present invention improves operability when redisplaying the map image of a location distant from the current displayed map image being displayed.

In addition, the map image display program according to the present invention of the above type of map image display device also preferably displays that selected name at a position superimposed on the map image peripheral part corresponding to the bearing from the center of the map image to be displayed.

According to the present invention, a distant name representing a location not included in the current displayed map image to be displayed is displayed in an easy to understand manner on the current displayed map image, and is made available for selection by the user through an input command. Furthermore, if a user selectable name displayed on the current displayed map image is specified, then a new map image in the vicinity of that specified name becomes the object (map image) to be displayed. Therefore, the present invention enables the user to display, with extremely simple operation, a map image of a location distant from the current displayed map image currently being displayed.

One conceivable method of selecting a distant name not included in the current displayed map image and located at a distant position is, for example, to set a prescribed distance, which is called a telephoto distance, and then to select the distant name of a location that is distant by at least approximately the telephoto distance from the center of the current displayed map image to be displayed. In addition to displaying a map image linked to the route guidance function, it is also acceptable to select the name of the destination or the name of an en-route location that is not included in the current displayed map image to be displayed.

Next, a specific embodiment will be explained wherein the present invention was applied to an in-vehicle navigation device that provides support for vehicular travel while displaying a map image.

FIRST EMBODIMENT

Referring initially to FIGS. 1–10, an in-vehicle navigation device 1 with a map image display program is illustrated in accordance with a first embodiment of the present invention. The in-vehicle navigation device 1 with a map image display program constitutes one example of a map image display in accordance with the present invention.

FIG. 1 schematically shows one example of a configuration of the in-vehicle navigation device 1 in which the present invention is applied. The in-vehicle navigation device 1 shown in FIG. 1 basically comprises an input unit 2, a vehicle position detecting unit 3, a map data storage unit 4, a display unit 5 and a control unit 6.

The input unit 2 is configured and arranged for the user to input various commands to the in-vehicle navigation device 1. Specifically, for example, the input unit 2 is configured and arranged to input various commands into the in-vehicle navigation device 1 by utilizing a voice input recognition device. If a voice input recognition device is used as part of the input unit 2, then the user can input commands and the like by voice for specifying the map image to be displayed, thereby improving operability. Alternatively, the input unit 2 is configured and arranged to include other input devices as part of the input unit 2 including, but not limited to, an operation switch, a joy stick, or a touch panel. In addition, the input unit 2 is more preferably configured and arranged to use a voice input recognition device and the like in combination with one or more of the other input devices as part of the input unit 2. The user's input commands that are inputted through the input unit 2 into the in-vehicle navigation device 1 are sent to the control unit 6 of the in-vehicle navigation device 1 for processing. The input devices of the input unit 2 are conventional components that are well known in the art. Since input devices are well known in the art, these structures will not be discussed or illustrated in detail herein.

The vehicle position detecting unit 3 is configured and arranged for detecting the current position of a vehicle in which the in-vehicle navigation device 1 is installed. The vehicle position detecting unit 3 comprises, for example, a GPS (Global Positioning System) receiver, a geomagnetic sensor, a gyroscope or gyro sensor, or any one of various sensors like a distance sensor. In any event, the vehicle position detecting unit 3 is constituted so that it accurately detects the current position of the vehicle by compensating the absolute position and bearing obtained from the GPS receiver based on the output received from various sensors like a geomagnetic sensor, a gyroscope or gyro sensor, or a distance sensor. The position information, which indicates the current position of the vehicle detected by the vehicle position detecting unit 3, is sent to the control unit 6 for processing. The various sensors used in the vehicle position detecting unit 3 are conventional components that are well known in the art. Since these various sensors used in the vehicle position detecting unit 3 are well known in the art, these structures will not be discussed or illustrated in detail herein.

The map data storage unit 4 has a recording medium such as a DVD-ROM (Digital Versatile Disc-Read Only Memory) on which map data is stored. The map data is preferably configured and arranged to include node data that indicates points on the map, link data that links the nodes, and the like. Further, the data structure of the map data is such that the data is divided into data units that can be processed in one shot. For example, the data structure of the map data is preferably configured and arranged such that each district is assigned a district number, latitude data, and longitude data, thereby enabling each district to be uniquely specified. In addition, the map data as well as name data, such as location names and facility names, are stored on the recording medium associated with position information that indicates the position thereof on the map. The map data and the name data that were read from the map data storage unit 4 are sent to the control unit 6 for processing. Furthermore, if the in-vehicle navigation device 1 has a function that uses wireless communication and the like to receive data from a data server that provides information, then it is also acceptable to acquire the map data and the name data from the data server, and send that data to the control unit 6 for processing.

Based on control executed by the control unit 6, the display unit 5 displays a map image and various types of information determined in accordance with an input command from the user. For example, the display unit 5 preferably comprises a liquid crystal display that is configured and arranged to display the various images needed to carry out the present invention. Furthermore, if a touch panel is used as part of the input unit 2, then the input unit 2 and the display unit 5 are constituted as an integrated device. The display units, such as the display unit 5, are conventional components that are well known in the art. Since display units are well known in the art, the structures associated with the display unit 5 and/or the input unit 2 will not be discussed or illustrated in detail herein.

The control unit 6 controls the entire operation of the in-vehicle navigation device 1, in which the present invention is applied. The control unit 6 preferably includes a microcomputer with a navigation control program that controls the in-vehicle navigation device 1 as discussed below. The control unit 6 also includes a map image display program that controls the map image device of the in-vehicle navigation device 1 as discussed below. The map image display program can be either preinstalled in a computer-readable medium of a storage device in the control unit 6 or uploaded via a computer-readable medium to the control unit 6.

The control unit 6 also preferably includes other conventional components such as an input interface circuit, an output interface circuit, a CPU peripheral circuit, and the like as well as storage devices such as a hard drive, a CD-ROM drive, a ROM (Read Only Memory) device, a RAM (Random Access Memory) device and the like. The control unit 6 has the map image display program stored in a computer-readable medium such as a hard drive, a CD-ROM, a ROM (Read Only Memory) device, a RAM (Random Access Memory) device or the like. Thus, the control unit 6, preferably, has microprocessor configuration in which these components are connected via a bus. Furthermore, the control unit 6 is constituted so that it controls the entire operation of the in-vehicle navigation device 1 by the CPU using the RAM as work area to execute various arithmetic processes based on various control programs stored in the ROM. Accordingly, the microcomputer of the control unit 6 is programmed with a map image display program that controls the map image display device of the in-vehicle navigation device 1. It will be apparent to those skilled in the art from this disclosure that the precise structure and algorithms for the control unit 6 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In particular, in the in-vehicle navigation device 1 in which the present invention is applied, the control unit 6 includes hardware and/or algorithm or software that forms a map image setting section or component 11, a telephoto distance setting section or component 12, a display name selecting section or component 13 and a display image creating section or component 14. Thus, the control unit 6 implements a map image setting function (section 11), a telephoto distance setting function (section 12), a display name selecting function (section 13), and a display image creating function (section 14) by the CPU executing a map image display program, which is stored in the ROM, as one of the control programs.

Furthermore, in configuration of the present invention, the in-vehicle navigation device 1 is configured and arranged to pre-store the map image display program in the ROM of the control unit 6 for implementing each of the abovementioned functions in the control unit 6. In an alternative configuration of the present invention, the in-vehicle navigation device 1 is configured and arranged to read the map image display program from a computer-readable medium such as a CD-ROM that is read by the DVD-ROM drive of the map data storage unit 4 and then store the map image display program in the ROM of the control unit 6. In addition, if the in-vehicle navigation device 1 has a function that receives data from a data server that provides information using wireless communication and the like, then the in-vehicle navigation device 1 is also preferably configured and arranged to acquire the map image display program from a computer-readable medium of the data server and then store the map image display program in the ROM of the control unit 6.

The map image setting section 11 determines which of map image out of the plurality of stored map images will be displayed in accordance with the input command of the user, who is using the input unit 2. In other words, the map image setting section 11 analyzes the user's input command that is sent from the input unit 2. If the user input command is one that commands the display of a specific map image on the display unit 5, the map image setting section 11 determines the display object to be the map image in accordance with that input command. In particular, in the in-vehicle navigation device 1 in which the present invention is applied, if an input command has been input that specifies one of the user selectable name that is superimposed on the current displayed map image, then the map image setting section 11 determines a new display object to be the new map image based on the specified name for displaying an area in the vicinity of the specified name.

Furthermore, if there is no input command inputted from the user, at the time of initialization or during regular route guidance and the like, that specifies a map image to be displayed, then the map image setting section 11 determines the map image to be displayed, based on the position information detected by the vehicle position detecting unit 3 that indicates the current position of the vehicle. In other words, the current displayed map image that includes the area surrounding the vehicle will be displayed on the display unit 5 based on the current position of the vehicle.

The telephoto distance setting section 12 sets the telephoto distance to a prescribed distance from the center of the current displayed map image, which the map image setting section 11 determined to be displayed. The telephoto distance is a prescribed distance measured from the center of the displayed map image to a position not included in the displayed map image. Further, the telephoto distance is a standard for selecting one or more names to be displayed on the displayed map image as distant map names that are not included in the displayed map image that the map image setting section 11 has currently determined to be displayed. In other words, the term "distant map names" as used herein refers to a location (e.g., area, city, building, landmark, etc.) that is not located within the area of the current displayed map.

Figure 2:
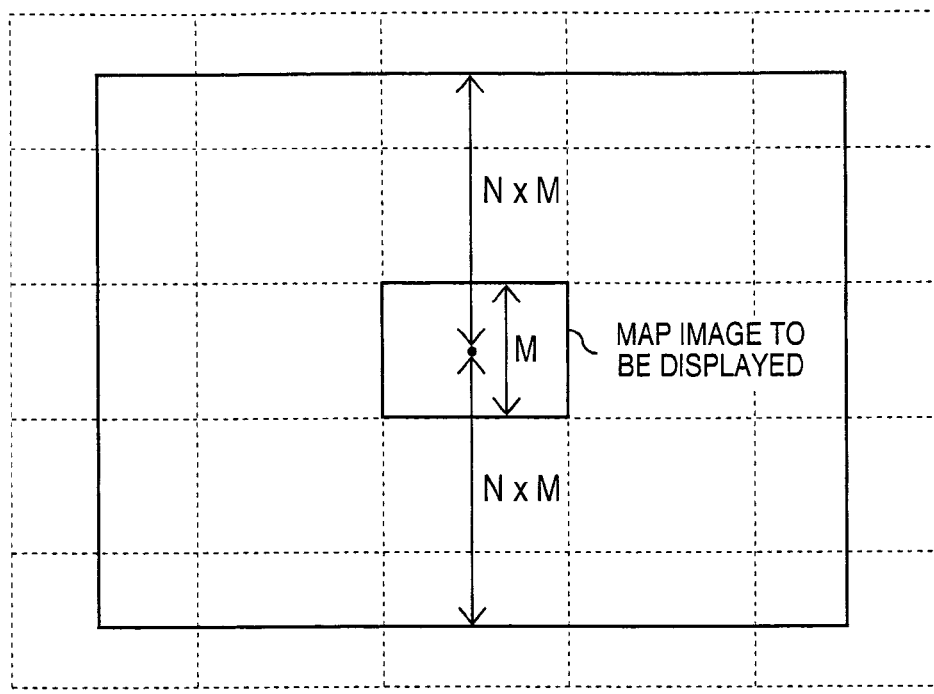
FIG. 2 is a diagram illustrating a technique by which a telephoto distance is set in accordance with a scale of a map image to be displayed in accordance with the first embodiment of the present invention.

Specifically, the telephoto distance setting section 12 sets the telephoto distance to the distance from the center of the map image to be displayed to a position separated by a plurality of map units N, with each map unit N being equivalent to a dimension of a relevant map image. For example, the size of each map unit N can be preset in accordance with the scale of the current displayed map image that the map image setting section 11 has determined to be displayed. As shown in FIG. 2, the map unit N can be based on the current displayed map image. For example, if a dimension M represents the distance between the horizontal edges of the region indicated by the current displayed map image, then the telephoto distance is set to the distance equivalent to N×M (where the map unit N is an integer greater than or equal to 1). The actual distance that corresponds to dimension M varies according to the scale of the displayed map image. Thus, FIG. 2 illustrates an example of a case where map unit N=2. As described above, if the telephoto distance setting section 12 sets the telephoto distance in accordance with the scale of the map image to be displayed, then the telephoto distance is adjusted to correspond to the sense of distance on the current displayed map image. Thus, even if the map image to be displayed is switched and the scale changes, an appropriate telephoto distance is used for the new scale.

Furthermore, the method by which the telephoto distance setting section 12 sets the telephoto distance is not limited to the above example. Alternatively, the telephoto distance setting section 12 is configured and arranged to employ other methods, such as: preregistering an absolute distance, and setting the telephoto distance to the preregistered absolute distance. Alternatively and/or in addition to the other methods, the telephoto distance setting section 12 is configured to set the telephoto distance in accordance with an operational input from a user using the input unit 2. Thus, the user can manually set the telephoto distance using the input unit 2 so as to override the preprogrammed method of setting telephoto distance. The optimal method should be employed according to the in-vehicle navigation device 1 usage environment, and the like.

In addition, if the vehicle in which the in-vehicle navigation device 1 is installed is traveling, then the telephoto distance setting section 12 is preferably configured to determine the travel speed of the vehicle based on information (e.g., a signal) from a vehicle speed sensor 7 provided in the vehicle, and to change the telephoto distance in accordance with the vehicle's travel speed.

Figure 3:
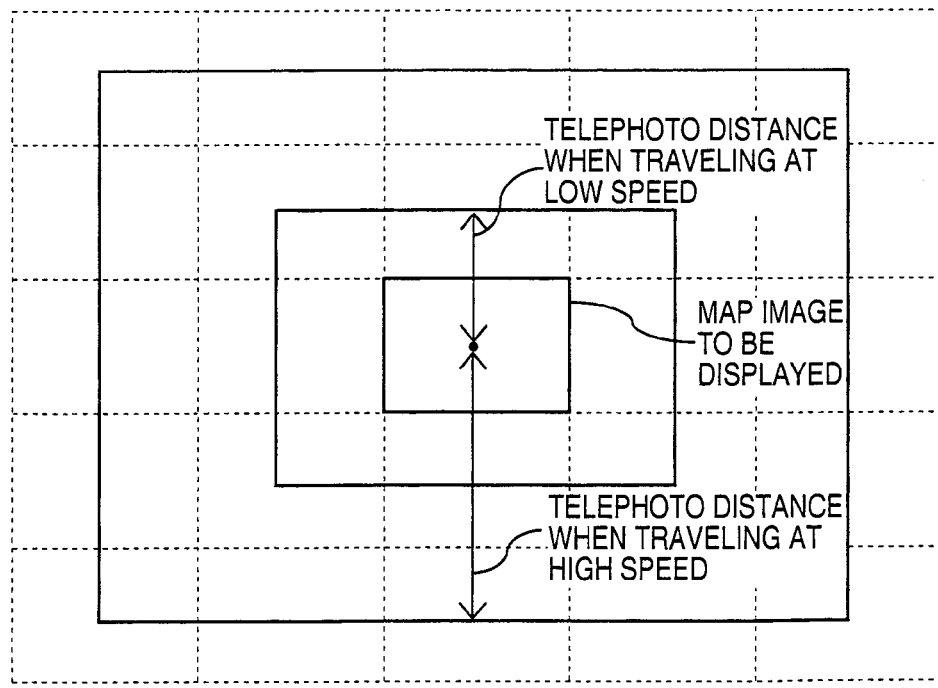
FIG. 3 is a diagram illustrating a technique by which the telephoto distance is varied according to the travel speed of the vehicle in accordance with the first embodiment of the present invention.

Specifically, as shown in FIG. 3, for example, the telephoto distance is set to a comparatively short distance if the vehicle is traveling at a low speed, i.e., below a predetermined speed. However, the telephoto distance is set to a comparatively long distance if the vehicle is traveling at a high speed, i.e., above a predetermined speed. In addition, the telephoto distance setting section 12 is preferably configured to more finely set the telephoto distance by partitioning the travel speed of the vehicle into several predetermined ranges such that each of the predetermined ranges has a preset telephoto distance. For example, four preset telephoto distance are predetermined to correspond to four predetermined traveling speed ranges, with the preset telephoto distances becoming increasingly larger as the traveling speed ranges cover higher vehicle speeds. In particular, a first preset telephoto distance is set when the vehicle is traveling in the range between 0 km/h to 30 km/h, a second preset telephoto distance is set when the vehicle is traveling in the range between 30 to 60 km/h, a third preset telephoto distance is set when the vehicle is traveling in the range between 60 to 100 km/h, and a fourth preset telephoto distance is set when the vehicle is traveling in the range greater than 100 km/h. Thus, the telephoto distance setting section 12 is configured and arranged to switch the telephoto distance in stages so that the higher the travel speed of the vehicle, the longer the telephoto distance.

Furthermore, the telephoto distance setting section 12 is alternatively configured and arranged to switch the telephoto distance based on the type of the road on which a vehicle travels. For example, the telephoto distance setting section 12 is configured and arranged to set a different telephoto for each type of road, e.g., secondary streets, arterial local roads, national highways, and expressways. Preferably, the telephoto distance setting section 12 is configured and arranged to set the telephoto distance such that the longer a vehicle is traveling on a high-speed road, the longer the telephoto distance is set. Thus, if the telephoto distance setting section 12 is configured and arranged so that the telephoto distance varies according to factors like the class or type of the road on which the vehicle is traveling and the travel speed of the vehicle, then the telephoto distance that forms the standard by which a distant map name to be displayed on the map image if selected takes on a value that conforms to the actual travel of the vehicle. This arrangement of the telephoto distance setting section 12 makes it possible to appropriately select a distant map name that the user probably feels the need to select in accordance with the traveling conditions of the vehicle.

The display name selecting section 13 is configured to selects which user selectable names, including intra-map names and distant names, that are to be superimposed on the current displayed map image to be displayed and that are available to be selected by the user's input command. In other words, when the current displayed map image to be displayed has been determined by the map image setting section 11, the display name selecting section 13 first acquires, from the map data storage unit 4, the name data of all of the user selectable names that can be displayed on the current displayed map image to be displayed for the user to select. The user selectable names that correspond to a location on the current displayed map image will be referred to as intra-map names, while the user selectable names that do not correspond to a location on the current displayed map image will be referred to as distant map names. Then the display name selecting section 13 selects only an appropriate number of the intra-map names, among all of the intra-map names that were acquired, that the display name selecting section 13 determines to be highly necessary to display as the user selectable names to be displayed on the map image in accordance with preset conditions. The necessity to display a user selectable name is determined based on a preassigned priority level assigned to those names. For example, if the name is a location name, the determination is based on the class or type of location (e.g., prefecture, district, city, town, etc.) indicated by the location name. In addition, the number of intra-map names selected to be displayed is set to a level taking into consideration other preset conditions or factors such as the ease of viewing the display, and so that the display does not become confusing.

Figure 4:
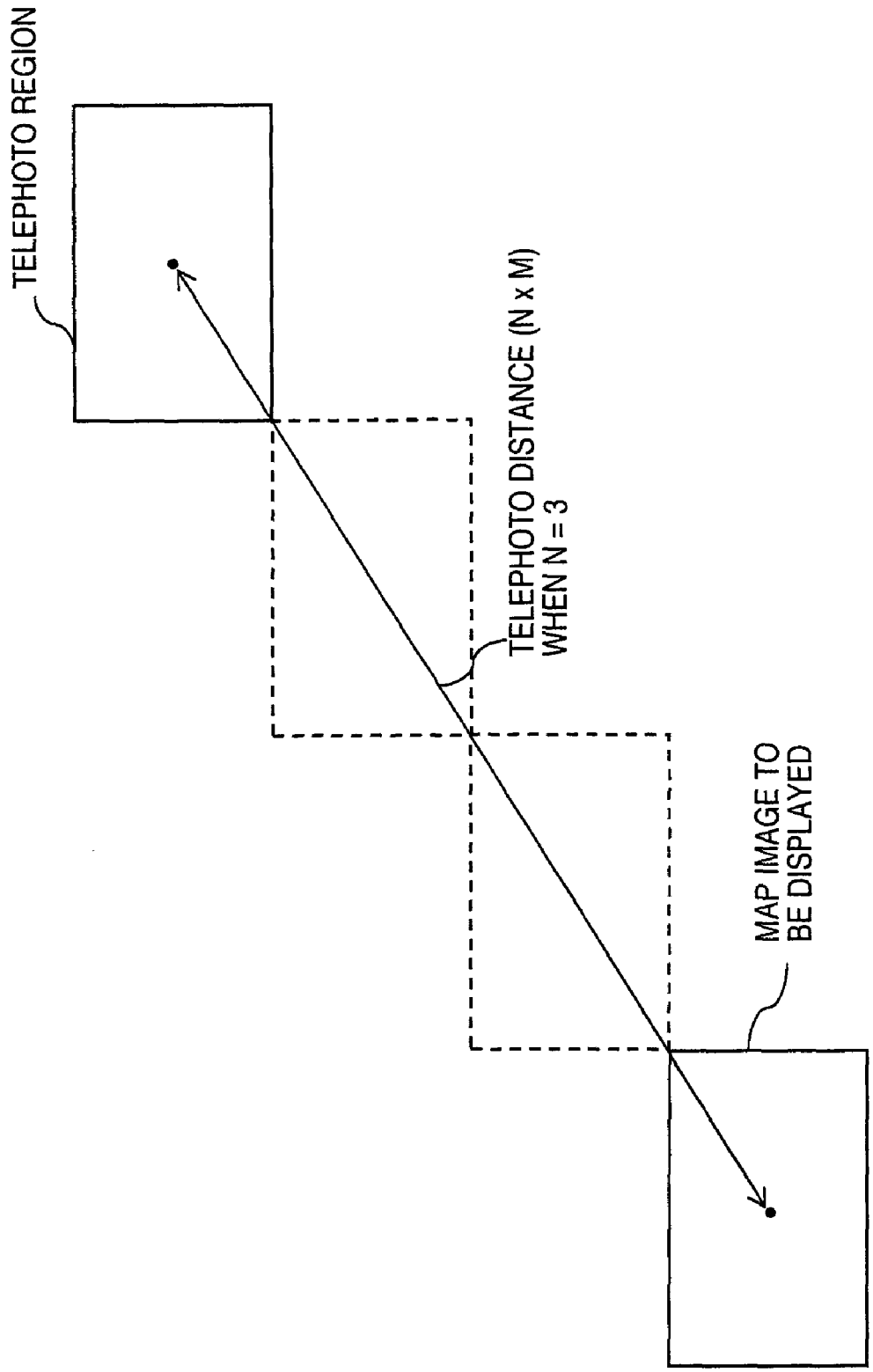
FIG. 4 is a diagram illustrating a technique for defining the telephoto region in accordance with the first embodiment of the present invention.

Next, the display name selecting section 13 determines a telephoto region based on a position distant from the center of the current displayed map image to be displayed as determined by the map image setting section 11 and a distance based just on the telephoto distance set by the telephoto distance setting section 12. Specifically, as shown in FIG. 4, for example, the position distant is set as the center point by just the telephoto distance from the center of the current displayed map image to be displayed, and a region of the same size as the current displayed map image to be displayed is set as the telephoto region with the position distant being the center point of the telephoto region. Further, the name data of the user selectable names (hereinafter, referred to as the telephoto names) included in the telephoto regions are acquired from the map data storage unit 4, and just an appropriate number of the telephoto names among those telephoto names determined to be highly necessary to be displayed are selected as the distant names to be displayed. The determination of the necessity to display a distant or telephoto name is made, the same as when selecting intra-map names, based on a priority level preassigned to that name. Moreover, the number of the distant map (telephoto) names selected to be displayed is determined taking into consideration factors such as the ease of viewing the display. In addition, the display name selecting section 13 is preferably configured to select as the distant map (telephoto) names to be displayed those telephoto names whose position is closest to the center of the telephoto region.

Furthermore, if the vehicle in which the in-vehicle navigation device 1 is installed is traveling, then the display name selecting section 13 is also configured to select as the distant map (telephoto) names to be displayed only those telephoto names included in the telephoto region positioned in the direction of the vehicle's travel. In other words, when the vehicle is traveling, those distant or telephoto names ahead of the traveling direction of the vehicle are thought to be highly necessary for the user. Therefore, only those the distant map (telephoto) names are selected as the telephoto names to be displayed. In this case, because only those telephoto names felt to be necessary for the user while the vehicle is traveling are displayed, the display can be made easier for the user to view.

In addition, it is also acceptable to store in advance name data that indicates the intra-map names, the distant map (telephoto) names, and the like. For example, location names, topographical feature names (mountain names, plateau names, lake names, and the like), and station names are recorded as name data in advance on the computer-readable medium of the map data storage unit 4 in such a manner that the type of the name data can be discriminated. Thus, the type of the name data are selected for displaying by the display name selecting section 13, in accordance with the user input command of the user using the input unit 2. In other words, the type of names to be displayed from intra-map names and the distant map (telephoto) names are selected by the user specifying a type or category of names to be displayed. In one case, the names of interest can be appropriately selected to be displayed in accordance with the requirements and purpose of the user, and can be superimposed on the map image.

Figure 5:
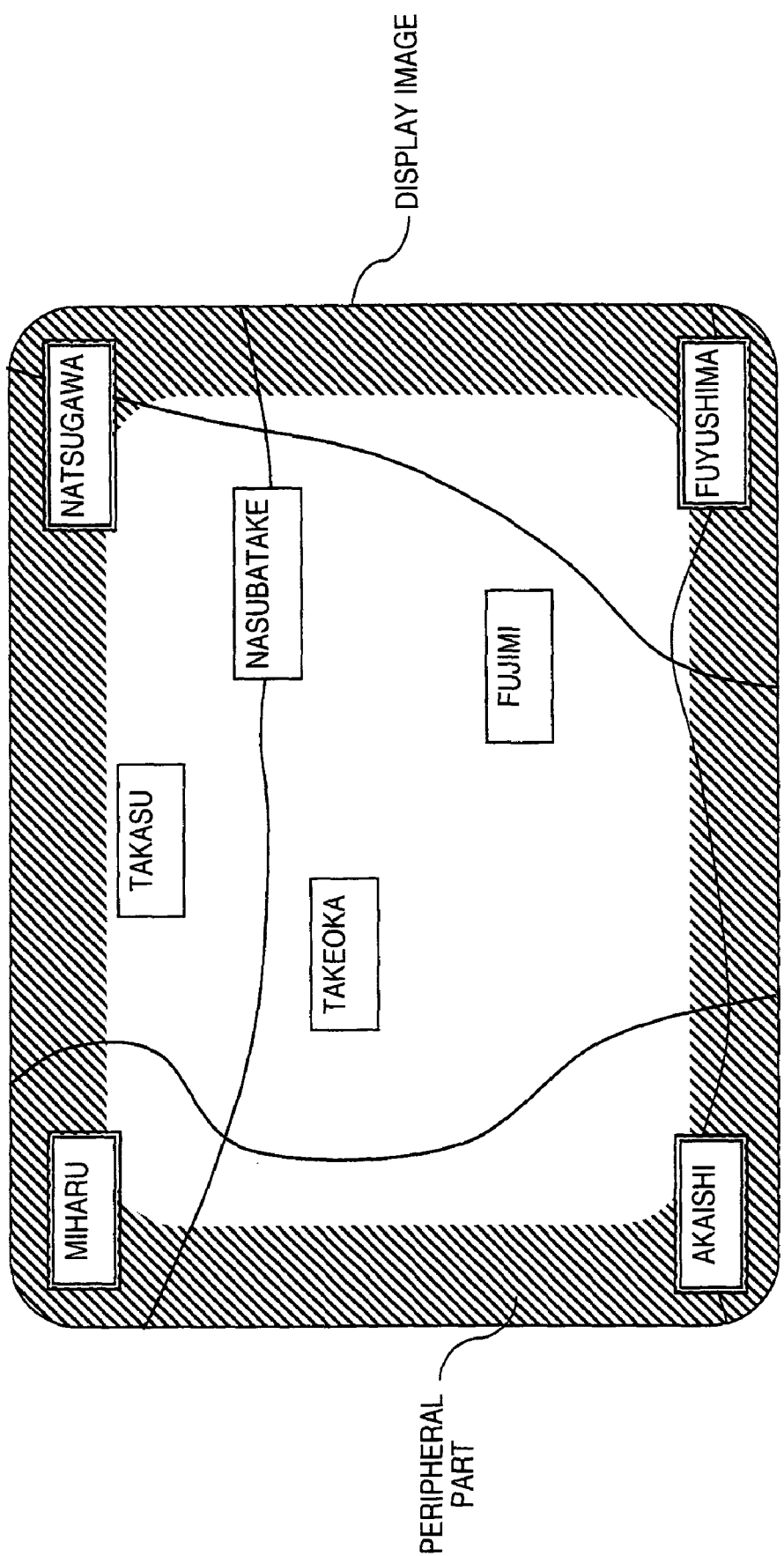
FIG. 5 is a diagram illustrating one example of a display image displayed on the display unit of the in-vehicle navigation device in accordance with the first embodiment of the present invention.
Figure 6:
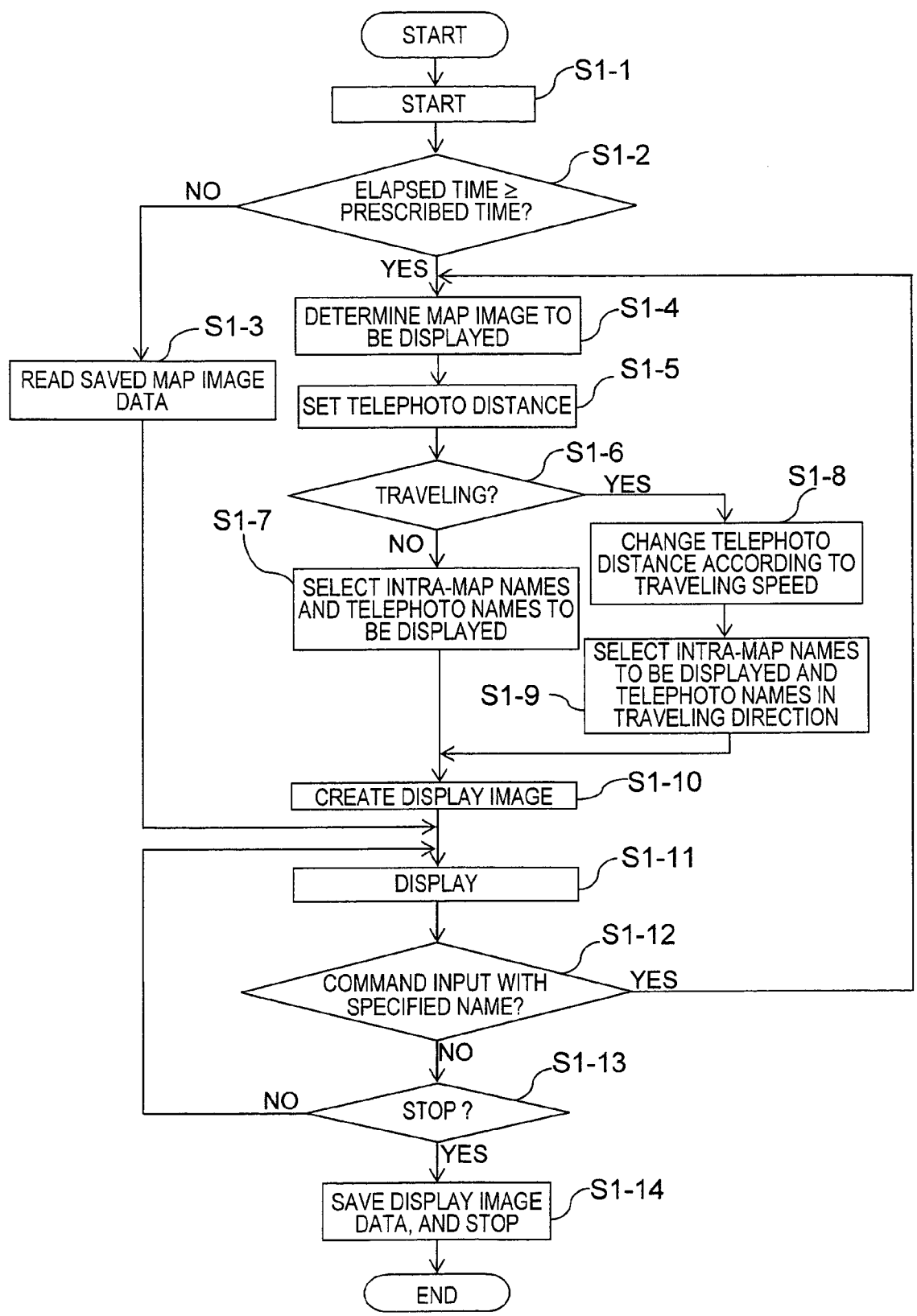
FIG. 6 is a flow chart that shows one example of the processing of the control unit, wherein a display image is displayed on the display unit in accordance with the user's input command, in the in-vehicle navigation device in accordance with the first embodiment of the present invention.

As shown in FIG. 5, for example, the display image creating section 14 creates a display image having the intra-map names (e.g. Takasu, Takeoka, Nasubatake, and Fujimi) displayed in the main part of the map image, and the distant map (telephoto) names (e.g. Miharu, Natsugawa, Akaishi, and Fuyushima) displayed in the peripheral part of the map image. The intra-map names and the distant map (telephoto) names are selected by the display name selecting section 13 are superimposed on the map image as determined by the map image setting section 11. In other words, when the current displayed map image to be displayed has been determined by the map image setting section 11, the display image creating section 14 acquires from the map data storage unit 4 the map data for creating the map image to be displayed. In addition, when the intra-map names and the distant map (telephoto) names to be displayed have been selected by the display name selecting section 13, the name data that indicates these intra-map names and the distant map (telephoto) names to be displayed are acquired. Furthermore, the display image creating section 14 processes this data, and creates a display image wherein the intra-map names and the distant map (telephoto) names are superimposed on the map image.

At this time, the intra-map names are displayed at points indicated by the relevant intra-map name on the map image. In other words, the intra-map names are displayed at points on the map image that substantially corresponds to their locations on the map image. However, the distant map (telephoto) names are displayed on the peripheral part of the map image, as shown by the hatched lines in FIG. 5. In other words, the locations corresponding to the telephoto names are not displayed on the map images so the telephoto names are merely displayed on the peripheral part of the map image. Preferably, the telephoto names are displayed on the peripheral part of the map image at the points that indicated the substantial relative direction of the telephoto names relative to the center of the map image. Thus, a telephoto name is preferably displayed at a point on the peripheral part of the map image corresponding to the relative direction of the location corresponding to that telephoto name. Thereby, the intra-map names and the distant map (telephoto) names are displayed in a form that reflects their actual relative positions on the map image, making it possible for the user to appropriately grasp their positional relationships. Furthermore, it is preferable to display the distant map (telephoto) names at the peripheral part of the map image with a display format different from that of the intra-map names. Thus, if the distant map (telephoto) names and the intra-map names are displayed with differing display formats, then the user can easily determine at a glance whether a name displayed on the map image is a distant map (telephoto) name or an intra-map name.

The data of the map image created by the display image creating section 14 is sent to the display unit 5. Further, the display unit 5 performs a display operation based on this map image data, and a map image of the type shown in FIG. 5 is thereby displayed on the display unit 5. Furthermore, the intra-map names and the distant map (telephoto) names superimposed on the map image in the display image that is displayed on the display unit 5 become subject to the next input command from the user. In other words, if a user who has referenced this display image inputs a command (for example, a voice input) that specifies an intra-map name or a telephoto name superimposed on the map image, then, based on that specified name, the map image that shows the vicinity of that specified name is determined to be newly displayed, and a new display image is displayed on the display unit 5. The new display image includes a new map image of the specified name with new intra-map names and new distant map (telephoto) names superimposed on the new map image.

The following explains one example of the processing of the control unit 6, which displays a display image on the display unit 5 in accordance with the user's input command, in the in-vehicle navigation device 1 constituted as described above, referencing the flow chart of FIG. 6.

First, the ignition switch of the vehicle in which the in-vehicle navigation device 1 is installed is turned on. Then, the in-vehicle navigation device 1 is started (step S1-1). Next, the control unit 6 determines whether a prescribed amount of time has elapsed time since the in-vehicle navigation device 1 was stopped, i.e., whether the elapsed time from when the in-vehicle navigation device 1 was previously stopped until it was started this time, is greater than or equal to a preset prescribed time (step S1-2). This step S1-2 takes into consideration that if the in-vehicle navigation device 1 is temporarily stopped. For example, the user dropping in somewhere for a short visit at a convenience store or gas station. Then the burden on the user will increase because the user will be requested to input a new command at that time. Thus, this step takes into consideration the fact that a temporary stop can be interpreted as a part of a series of driving actions. Accordingly, the prescribed time herein should be set to a time, e.g. one to three hours, in which it is possible to determine whether a stop of the in-vehicle navigation device 1 is temporary.

If it is determined in step S1-2 that the stop time of the in-vehicle navigation device 1 is less than a prescribed time, then the data of the display image saved in the display image creating section 14 of the control unit 6 (data of the display image before the stop) is read (step S1-3). Proceeding to step S1-11, based on the data of the display image saved in the display image creating section 14, the display image displayed before the stop is redisplayed on the display unit 5.

However, if it is determined in step S1-2 that the stop time of the in-vehicle navigation device 1 was greater than or equal to the prescribed time, then the map image setting section 11 of the control unit 6 determines a new map image to be displayed in accordance with an input command, by voice or other suitable method by the user using the input unit 2, or based on the position information detected by the vehicle position detecting unit 3 that indicates the current position of the vehicle (step S1-4).

Further, when the new map image to be displayed has been determined, the telephoto distance setting section 12 of the control unit 6 next sets the telephoto distance (step S1-5). Therein, the telephoto distance setting section 12 sets the telephoto distance to, for example, a distance corresponding to the scale of the map image to be displayed. Specifically, as discussed above, the telephoto distance is set to the distance from the center of the current map image to be displayed to a position separated therefrom by map units N pages (where map units N is an integer greater than or equal to 1), each map unit being equivalent to the size of the relevant map image. Alternatively, the telephoto distance setting section 12 sets the telephoto distance to a preregistered absolute distance, or a user selected distance in accordance with an input command from the user using the input unit 2.

After the telephoto distance has been set, the control unit 6 next determines whether the vehicle in which the in-vehicle navigation device 1 is installed is traveling based on information from the speed sensor 7 provided in the vehicle (step S1-6). If it is determined that the vehicle is not traveling, then the display name selecting section 13 of the control unit 6 next selects the intra-map names and the telephoto names to be displayed (step S1-7). Specifically, the display name selecting section 13 acquires from the map data storage unit 4 the name data of the intra-map names included in the map image determined in step S1-4 to be displayed, and selects to be displayed just the appropriate number of intra-map names, from among the acquired name data, having a high priority level. In addition, based on a position distant from the center of the current displayed map image to be displayed by the telephoto distance set in step S1-5, the display name selecting section 13 prescribes the telephoto region to be an area, for example, having a size that is the same as the current map image to be displayed and centered around this position. The display name selecting section 13 also acquires the name data of the telephoto names included in the telephoto regions from the map data storage unit 4, and selects to be displayed those distant map (telephoto) names having a high priority among the acquired name data, or those distant map (telephoto) names at a position near the center of the telephoto regions.

However, if it is determined in step S1-6 that the vehicle is traveling, then the telephoto distance setting section 12 changes the telephoto distance set in step S1-5 in accordance with the travel speed of the vehicle (step S1-8). Specifically, if the telephoto distance were set, for example, to N×M as discussed above (where the dimension M is the distance between the horizontal edges of the region indicated by the map image to be displayed, and map unit N is an integer greater than or equal to 1) as discussed above, then the telephoto distance setting section 12 changes the telephoto distance so that the higher the traveling speed of the vehicle, the longer the telephoto distance, i.e., sets N=N+1 if the traveling speed of the vehicle exceeds 30 km/h, sets N=N+2 if the traveling speed of the vehicle exceeds 60 km/h, and sets N=N+3 if the traveling speed of the vehicle exceeds 100 km/h. Furthermore, it is also acceptable to change the telephoto distance in accordance with the class of the road on which the vehicle is traveling, and it is also acceptable to change the telephoto distance so that the longer the vehicle is traveling on a high class road (e.g., corresponding to a secondary street, and arterial local road, a national highway, an expressway, and the like) the longer the telephoto distance.

Next, the display name selecting section 13 selects to be displayed just the appropriate number of intra-map names, among the intra-map names included in the map image to be displayed, having a high priority level, and also selects to be displayed any one of the telephoto names included in the telephoto region set in the direction of the vehicle's travel (step S1-9). In other words, when the vehicle is traveling, the display name selecting section 13 selects to be displayed only those distant map (telephoto) names included in the telephoto regions positioned in the direction of the vehicle's travel and thought to be highly necessary for the user. Furthermore, the traveling direction of the vehicle is determined based on information from the vehicle position detecting unit 3.

If the intra-map names and the telephoto names to be displayed have been selected in step S1-7 or step S1-9, then the display image creating section 14 of the control unit 6 next creates a display image wherein the selected intra-map names and telephoto names are superimposed on a map image set to be displayed (step S1-10). At this time, the intra-map names are displayed at points corresponding to the relevant intra-map names on the map image, and the distant map (telephoto) names are displayed at the peripheral part of the map image corresponding to the bearing at which a point is positioned when that point, which is indicated by the relevant telephoto name, is viewed from the center of the map image.

When the display image creating section 14 has created the display image, the data of the created display image is sent to the display unit 5, the display unit 5 then performs a display operation based on this display image data, and the display image is then displayed on the display unit 5 (step S1-11). The intra-map names and the distant map (telephoto) names superimposed on the map image in the display image displayed on the display unit 5 become subject to the user's next input command.

While the abovementioned type of display image is displayed on the display unit 5, the control unit 6 continuously monitors whether there is a new input command from the user that specifies an intra-map name or telephoto name superimposed on the map image (step S1-12). Further, if there is a new input command from the user that specifies an intra-map name or a telephoto name, then processing returns to step S1-4, whereupon the map image setting section 11 determines to be newly displayed the map image that indicates, based on a name specified by the user, the vicinity of that specified name, subsequent processing is repeated, and a display image that superimposes the intra-map names and the distant map (telephoto) names on the map image determined to be newly displayed is displayed on the display unit 5.

However, if there is no new input command from the user that specifies an intra-map name or a distant map (telephoto) name superimposed on the map image, then the control unit 6 determines whether an operation was performed that stops the in-vehicle navigation device 1 (step S1-13). The above type of display image is continuously displayed on the display unit 5 until an operation to stop the in-vehicle navigation device 1 is performed.

If it is determined in step S1-13 that an operation to stop the in-vehicle navigation device 1 was performed, then the data of the display image displayed on the display unit 5 is saved and the in-vehicle navigation device 1 is subsequently stopped (step S1-14). Then, the series of processes ends.

As explained above, if the map image to be displayed is determined by the in-vehicle navigation device 1 in which the present invention is applied, then the intra-map names included in the map image as well as the distant map (telephoto) names in the telephoto region distant from the map image are selected to be displayed. These selected intra-map names and distant map (telephoto) names are superimposed on the map image, making them available for selection by the user through user's next input command. Therefore, the user can display, with an extremely simple operation (i.e., the user inputs a command that specifies a distant map (telephoto) name superimposed on the map image), the map image of a location distant from the map image currently displayed.

Figure 7:
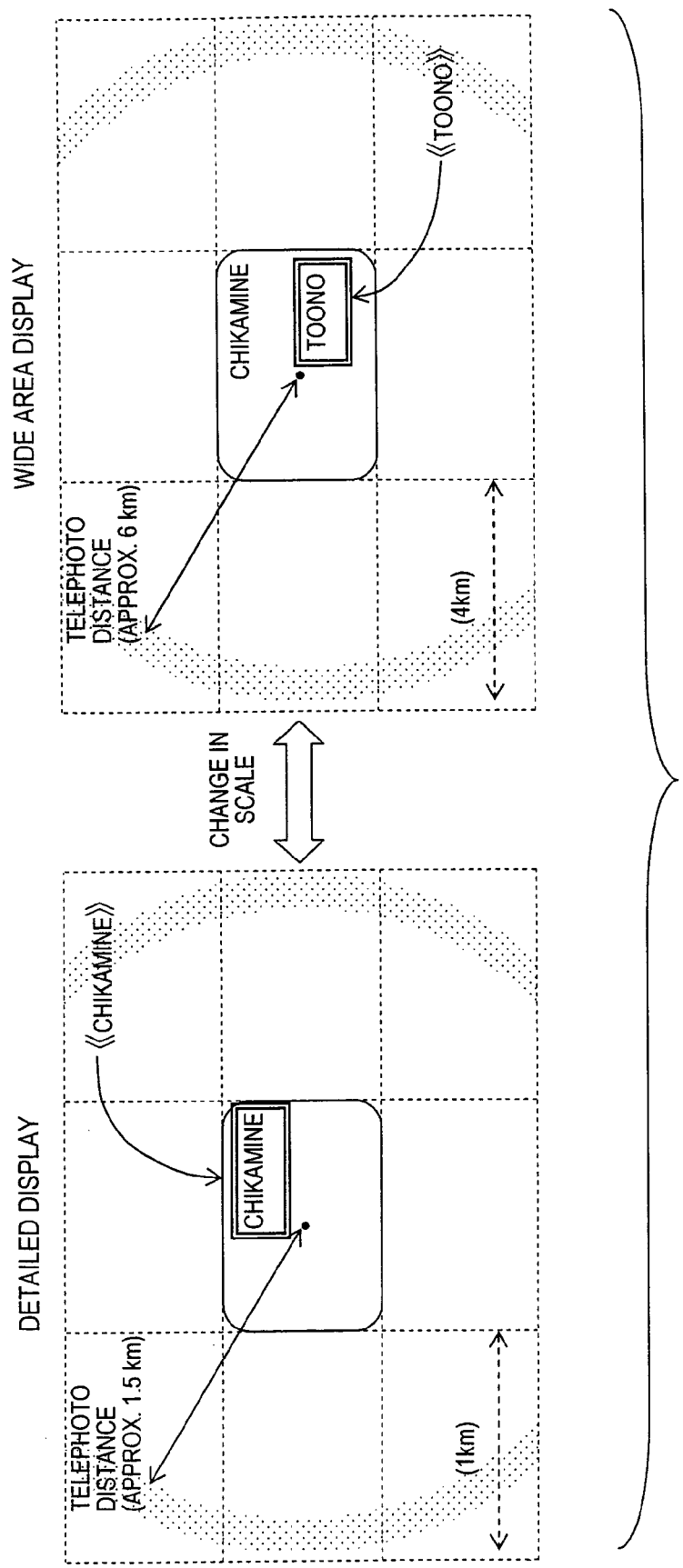
FIG. 7 is a diagram illustrating an aspect in which the telephoto distance changes when the scale of the map image to be displayed has changed in accordance with the first embodiment of the present invention.

In addition, as shown in FIG. 7 for example, the telephoto distance, which forms the basis of the telephoto name selection, is set according to the scale of the map image to be displayed. Thus, in this case, even if the map image to be displayed is switched to a different scale, the telephoto distance is adjusted to a distance that is appropriate for the new scale of the map image on the display. Thus, appropriate distant map (telephoto) names that do not discomfort the user are selected to be displayed, and then displayed on the map image. These new distant map (telephoto) names are now subject to the next input command.

Figure 8:
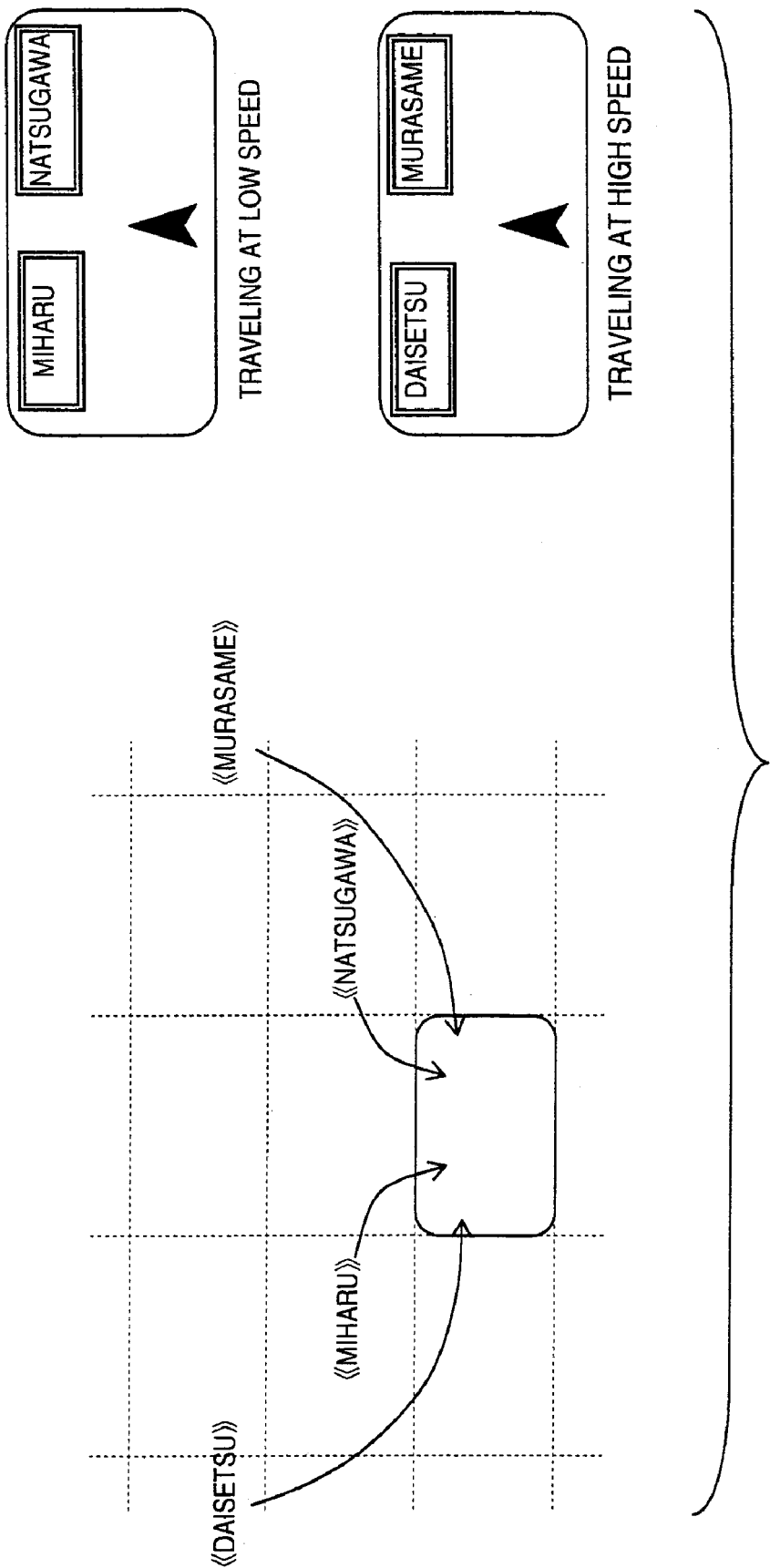
FIG. 8 is a diagram illustrating an aspect in which the telephoto name to be displayed changes when the telephoto distance has changed according to the travel speed of the vehicle in accordance with the first embodiment of the present invention.

In addition, as shown in FIG. 8 for example, the telephoto distance is made to vary according to the travel speed of the vehicle or the class of the road on which the vehicle is traveling. Thus, in this case, the telephoto distance, which forms the basis for the telephoto name selection can be set to a distance that conforms to the actual travel of the vehicle, and a telephoto region that the user probably feels is necessary according to the travel conditions of the vehicle can be appropriately selected, and displayed on the map image. These new distant map (telephoto) names are now subject to the next input command.

Figure 9:
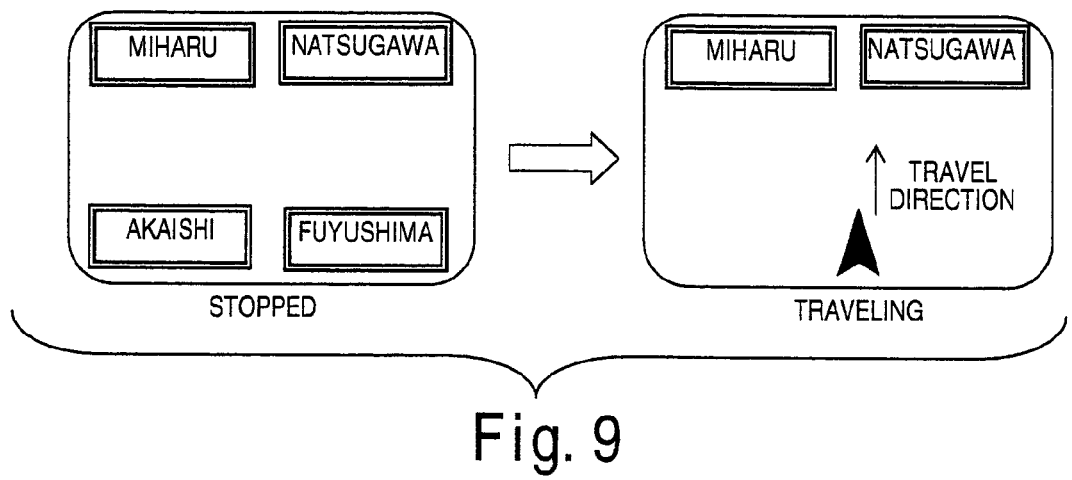
FIG. 9 is a diagram illustrating an aspect in which the telephoto names to be displayed are only those in the telephoto region in the direction of travel when the vehicle is traveling in accordance with the first embodiment of the present invention.

In addition, as shown in FIG. 9 for example, the distant map (telephoto) names are displayed differently depending on the traveling state of the vehicle. By selecting to be displayed only those distant map (telephoto) names located in the direction of the vehicle's travel when the vehicle is traveling, only those distant map (telephoto) names that the user probably feels necessary when the vehicle is traveling can be displayed on the map image. Thus, only the distant map (telephoto) names in the travel direction of the vehicle are now subject to the next input command, thus making the display easier to view.

Figure 10:
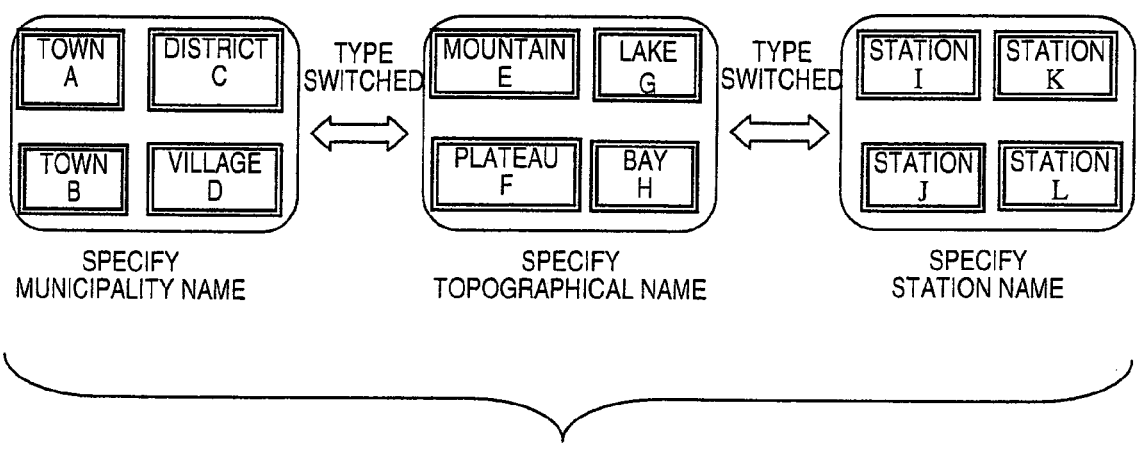
FIG. 10 is a diagram illustrating an aspect in which the type of telephoto name to be displayed is switched according to the user's input command in accordance with the first embodiment of the present invention.

In addition, as shown in FIG. 10 for example, intra-map names and distant map (telephoto) names of the type specified are selected to be displayed by the user according to the user's input command. Thus, only the intra-map names and distant map (telephoto) names that are of interest in line with the user's request and/or objectives are displayed on the map image. Thus, only intra-map names and the distant map (telephoto) names of specified type are now subject to the next input command.

SECOND EMBODIMENT

Figure 11:
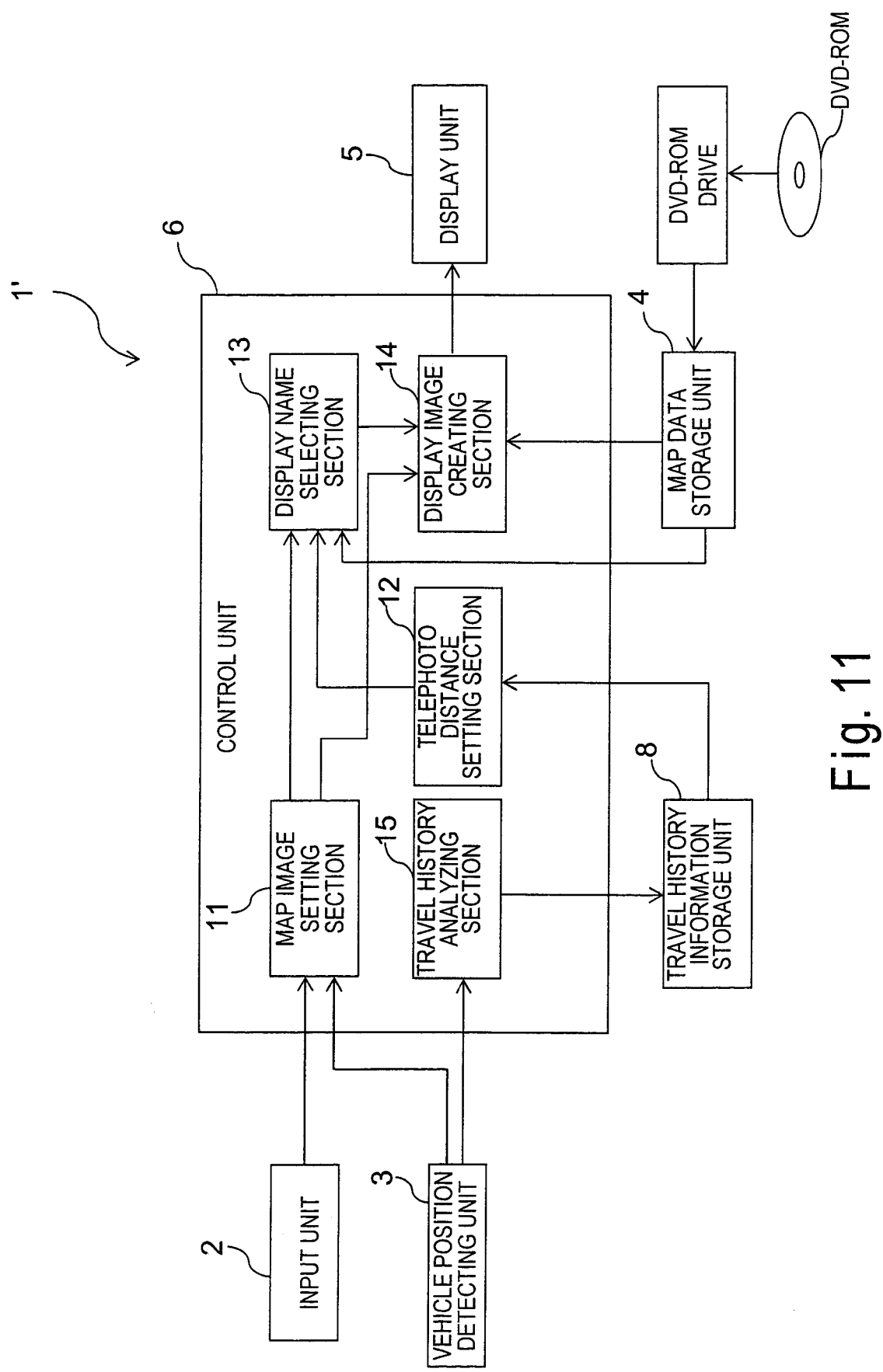
FIG. 11 is a block diagram that shows a schematic configuration of the in-vehicle navigation device including a map image display device with a map image display device program in accordance with a second embodiment of the present invention.
Figure 12:
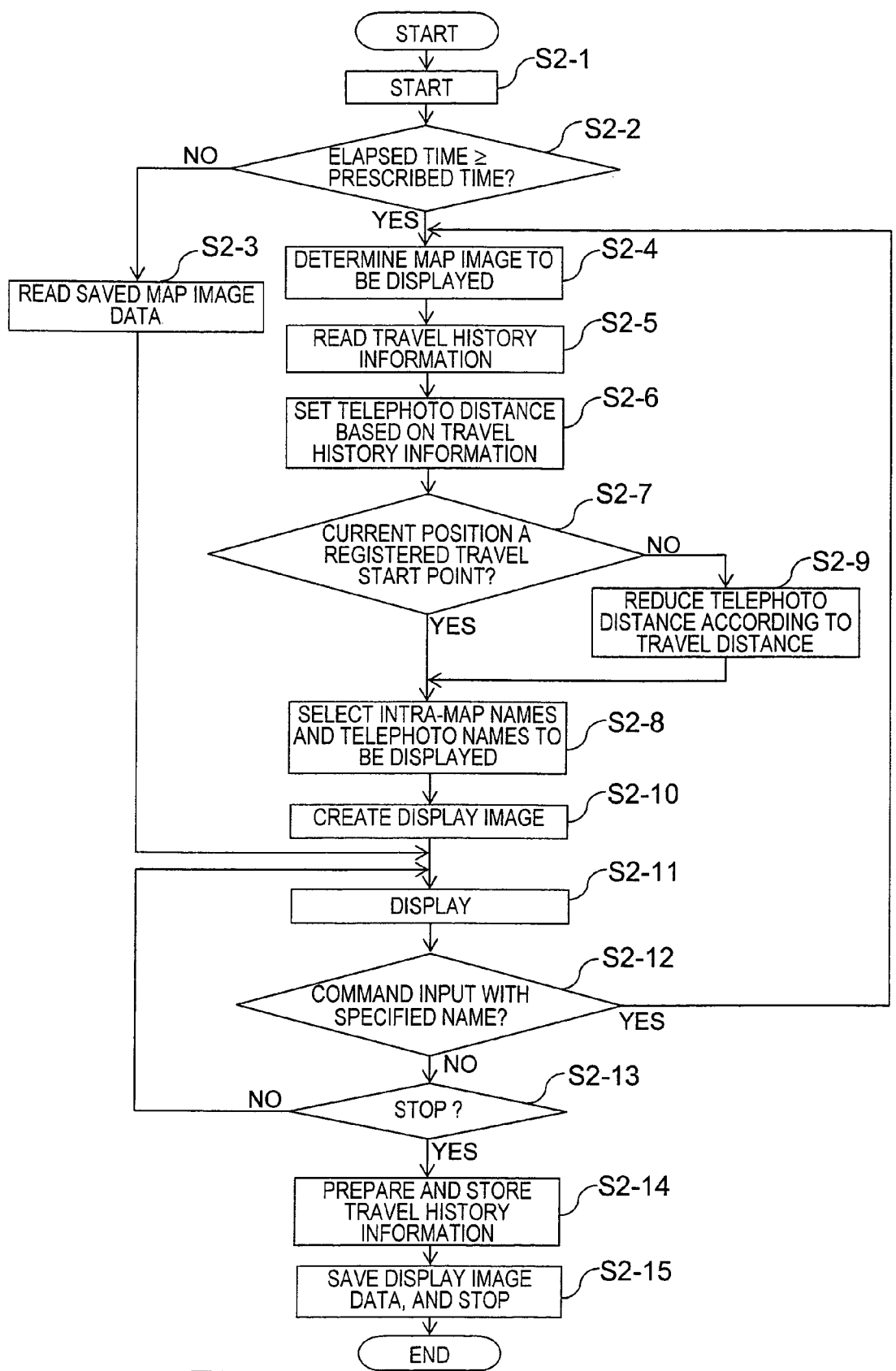
FIG. 12 is a flow chart that shows one example of the processing of the control unit, wherein a display image is displayed on the display unit in accordance with the user's input command, in the in-vehicle navigation device of the second embodiment of the present invention.

Referring now to FIGS. 11 and 12, an in-vehicle navigation device 1' with a map image display program is illustrated in accordance with a second embodiment of the present invention. The in-vehicle navigation device 1' with a map image display program constitutes one example of a map image display in accordance with the present invention.

The second embodiment is an example in which the telephoto distance, which forms the basis of the distant map (telephoto) name selection, is set based on the travel history of the vehicle. The construction and functions of the in-vehicle navigation device 1' are basically the same as the first embodiment discussed above. However, in the second embodiment, as shown in FIG. 11, a function is added to the control unit 6 as a travel history analyzing section 15, and a travel history information storage unit 8 is connected to the control unit 6.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The travel history analyzing section 15 prepares travel history information that indicates the travel history for each day of the vehicle in which the in-vehicle navigation device 1' is installed. In other words, when the ignition switch of the vehicle has been turned on, and the vehicle has begun to travel, the travel history analyzing section 15 acquires position information of the vehicle from the vehicle position detecting unit 3 at prescribed time intervals. The travel history analyzing section 15 thereby ascertains the travel trajectory of the vehicle. Further, when the ignition switch of the vehicle is turned off, a mechanism receives the ignition off signal and maintains the flow of electric current for at least a prescribed period of time. While this current is still flowing due to this mechanism, the travel history information that indicates the series of travel trajectories of the vehicle is prepared, and stored in the travel history information storage unit 8.

The travel history information of the vehicle prepared by the travel history analyzing section 15 is stored in the travel history information storage unit 8 and associated with information related to the creation date, i.e., the date, day, season, and the like, of the creation date.

In addition, in the in-vehicle navigation device 1' of the second embodiment, the telephoto distance setting section 12 implemented in the control unit 6 sets the telephoto distance, based on the vehicles travel history information that was stored in the travel history information storage unit 8. As mentioned above, the telephoto distance forms the basis of the telephoto name selection. Specifically, the telephoto distance setting section 12 reads the vehicle's travel history information stored in the travel history information storage unit 8, and then first calculates the daily average travel distance or maximum travel range of the vehicle. This calculated value indicates the average daily range of operation of the user. Further, for example, the telephoto distance setting section 12 sets the telephoto distance to the distance of half the average daily travel distance, or the distance equivalent to the average maximum travel range of the vehicle, i.e., a distance corresponding to the user's average radius of operation. Thereby, the telephoto distance, which forms the basis of the telephoto name selection, is set in a way that reflects the user's operational style. Thus, only those distant map (telephoto) names at locations that have a high possibility of being the user's destination are selected to be displayed, and are displayed on the map image.

Furthermore, it is also acceptable for the telephoto distance setting section 12 to calculate the daily average travel distance or maximum travel range of the vehicle for each day of the week or for each season, and to set the telephoto distance to a distance corresponding to the user's average radius of operation by the day of the week or by the season in which the in-vehicle navigation device 1' is used. In this case, the user's operational style, which varies according to the day of the week and the season (i.e., on a weekday or a weekend day, or during the summer or the winter), can be accurately reflected in the telephoto distance thus enabling to be displayed on the map image the distant map (telephoto) names of locations having a strong possibility of being the user's destination for the day of the week or the season.

In addition, the point at which the vehicle starts its travel each day, e.g., the user's home, is preregistered and the telephoto distance setting section 12 is configured to decrease the telephoto distance as the travel distance of the vehicle from the travel starting point increases. Considering the user's regular operational style, it is thought that the user's interest lies in locations close to the current position of the vehicle as the travel distance of the vehicle from the travel start point increases. Accordingly, if the telephoto distance is reduced as the travel distance of the vehicle from the travel start point increases, as described above, then distant map (telephoto) names of locations that are probably of interest to the user are selected to be displayed, and are displayed on the map image.

Referring to the flow chart of FIG. 12, the following explains one example of the processing of the control unit 6, in the in-vehicle navigation device 1' of the present embodiment as described above, wherein the display image is displayed on the display unit 5 in accordance with the user's input command.

The processing from step S2-1 to step S2-4 is the same as the processing in the first embodiment discussed above (refer to FIG. 6). If the map image to be displayed has been determined by the map image setting section 11 of the control unit 6 in step S2-4 of the present embodiment, then the telephoto distance setting section 12 of the control unit 6 next reads the travel history information of the vehicle from the travel history information storage unit 8 (step S2-5). Further, based on the travel history information read from the travel history information storage unit 8, a distance is calculated that corresponds to the day of the week in which the in-vehicle navigation device 1' is used, or the average radius of operation of the user in the season, and the telephoto distance is set to that calculated value (step S2-6).

When the telephoto distance has been set, the control unit 6 next determines whether the current position of the vehicle, ascertained based on the information from the vehicle position detecting unit 3, matches the preregistered travel start position (step S2-7). Further, if the current position of the vehicle matches the travel start position, then the display name selecting section 13 of the control unit 6 next selects the intra-map names to be displayed, as well as selects the distant map (telephoto) names to be displayed based on the telephoto distance set in step S2-6 (step S2-8). Furthermore, the specific method for selecting the intra-map names and the distant map (telephoto) names is the same as in the first embodiment discussed above.

However, if it is determined in step S2-7 that the current position of the vehicle differs from the preregistered travel start position, then the telephoto distance setting section 12 reduces the telephoto distance set in step S2-6 in accordance with the distance from the travel start position to the current position (travel distance) (step S2-9). Further, proceeding to step S2-8, the display name selecting section 13 selects the intra-map names to be displayed, as well as selects the telephoto names to be displayed based on the telephoto distance changed in step S2-9.

When the intra-map names and the distant map (telephoto) names to be displayed have been selected, the display image creating section 14 of the control unit 6 next creates a display image wherein the selected intra-map names and the telephoto names are superimposed on the map image determined to be displayed (step S2-10). At this time, the intra-map names are displayed at points corresponding to the location for the relevant intra-map names on the map image, and the distant map (telephoto) names are displayed at the peripheral part of the map image corresponding to the bearing at which a point is positioned when that point, which is indicated by the relevant telephoto name, is viewed from the center of the map image.

When the display image has been created by the display image creating section 14, the data of the created display image is sent to the display unit 5, and the display unit 5 performs a display operation based on the data of the display image, and the display image is thereby displayed on the display unit 5 (step S2-11). The intra-map names and the distant map (telephoto) names superimposed on the map image in the display image that is displayed on the display unit 5 now become available for the user to input a command.

While the above type of display image is displayed on the display unit 5, the control unit 6 continuously monitors whether there is a new input command from the user that specifies an intra-map name or a telephoto name superimposed on the map image (step S2-12). Further, if there is a new input command from the user that specifies an intra-map name or a distant map (telephoto) name, then processing returns to step S2-4, whereupon the map image setting section 11 determines the map image, which indicates, based on the name specified by the user, the vicinity of that name, to be newly displayed. Subsequent processing is then repeated, and a display image, wherein the intra-map names and the distant map (telephoto) names are superimposed on the map image that was determined to be newly displayed, is displayed on the display unit 5.

However, if there is no new input command from the user that specifies an intra-map name or a distant map (telephoto) name superimposed on the map image, then the control unit 6 determines whether an operation to stop the in-vehicle navigation device 1' has been performed (step S2-13), and the above type of display image is continuously displayed on the display unit 5 until an operation to stop the in-vehicle navigation device 1' is performed.

Furthermore, if it is determined in step S2-13 that an operation was performed to stop the in-vehicle navigation device 1', then the travel history analyzing section 15 of the control unit 6 first prepares the travel history information that indicates a series of vehicle travel trajectories that were ascertained based on information from the vehicle position detecting unit 3, and stores that travel history information in the travel history information storage unit 8 (step S2-14). Continuing, the data of the display image displayed on the display unit 5 is saved, the in-vehicle navigation device 1' is stopped (step S2-15), and the series of processes then ends.

According to the in-vehicle navigation device 1' of the second embodiment as explained above, the telephoto distance, which forms the basis of the telephoto name selection, is set so that it reflects the user's operational style. Moreover, the distant map (telephoto) names of locations that have a strong possibility of being the user's destination are selected to be displayed, and are displayed on the map image. Therefore, the user can specify a distant map (telephoto) name display superimposed on the map image simply by one input command, and can therefore display the map image of a location that has a strong possibility of being the destination, thus further improving operability.

In addition, if the telephoto distance, which forms the basis of the telephoto name selection, is set to a distance corresponding to the day of the week in which the in-vehicle navigation device 1' is used or to the average radius of operation of the user in the season, then differing user operational styles according to the day of the week or the season (i.e., a weekday or a weekend day, the summer or the winter) can be accurately reflected in the telephoto distance, and telephoto names of locations having a strong possibility of being the user's destination for the day of the week or the season can be displayed on the map image.

In addition, if the point at which the vehicle starts travel for a given day is preregistered, and the telephoto distance is reduced as the travel distance of the vehicle increases from the travel start point, then distant map (telephoto) names of locations in which the user probably has an interest can be accurately selected to be displayed, and then displayed on the map image.

THIRD EMBODIMENT

Figure 13:
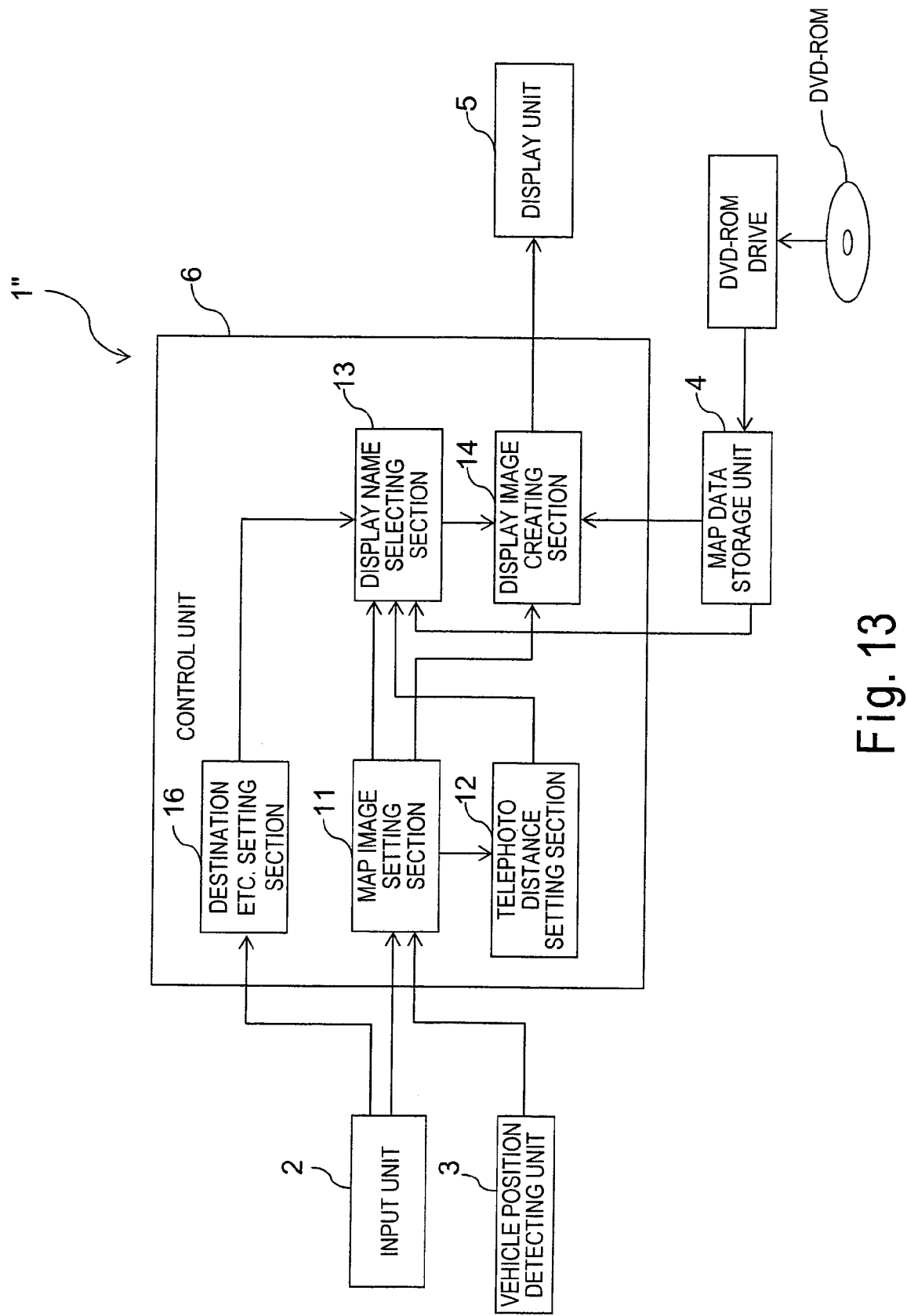
FIG. 13 is a block diagram that shows a schematic configuration of the in-vehicle navigation device including a map image display device with a map image display device program in accordance with a third embodiment of the present invention.
Figure 14:
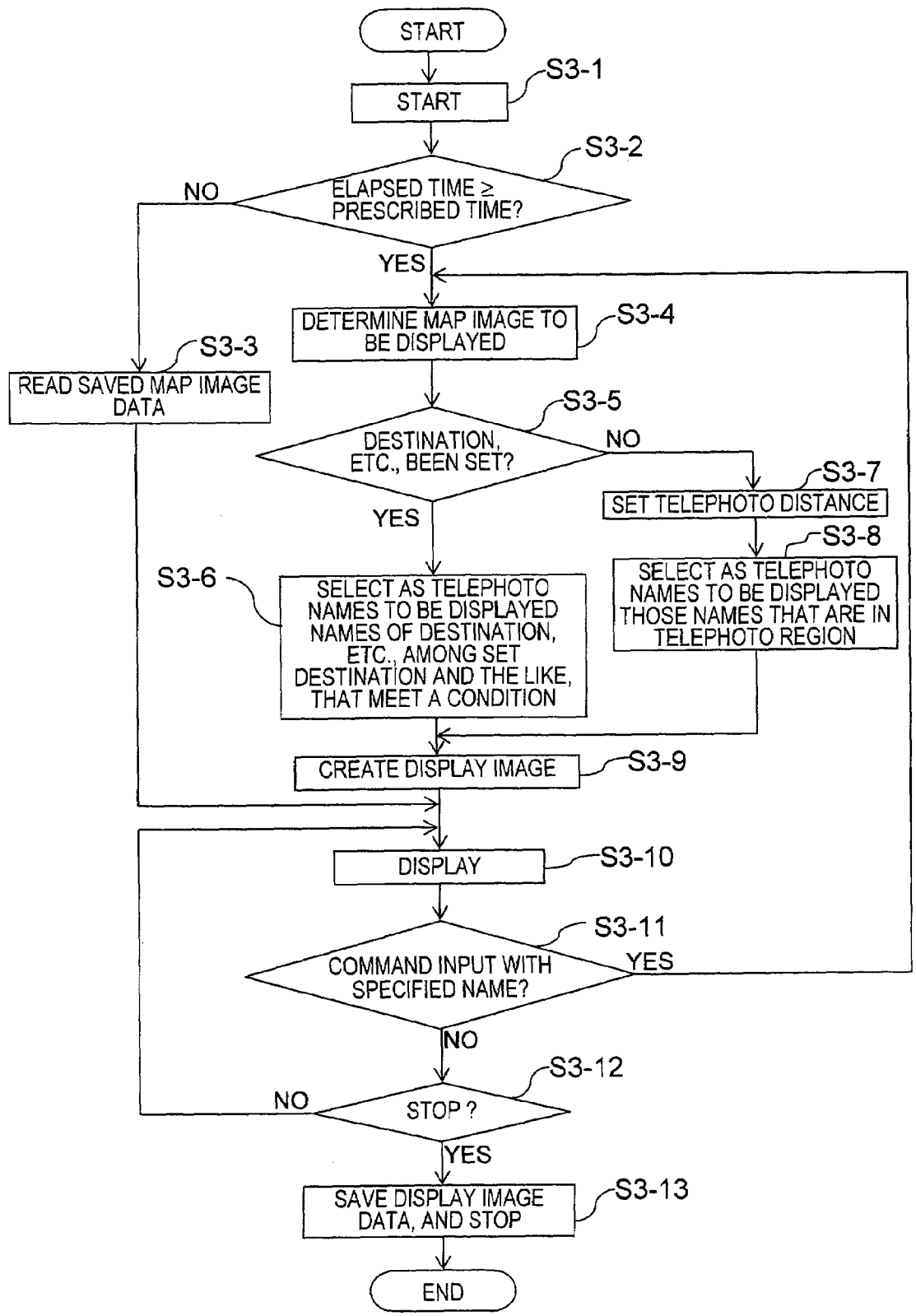
FIG. 14 is a flow chart that shows one example of the processing of the control unit, wherein a display image is displayed on the display unit in accordance with the user's input command, in the in-vehicle navigation device of the third embodiment of the present invention.

Referring now to FIGS. 13 and 14, an in-vehicle navigation device 1" with a map image display program is illustrated in accordance with a third embodiment of the present invention. The in-vehicle navigation device 1" with a map image display program constitutes one example of a map image display in accordance with the present invention.

The third embodiment is an example of selecting as the distant map (telephoto) names to be displayed, the names of points that are not included on the map image to be displayed that includes a set of en route locations or a destination, if such an en route location and/or a destination are set for route searching. The construction and functions of the in-vehicle navigation device are basically the same as the first embodiment discussed above. However, in the present embodiment, as shown in FIG. 13, the function of a destination etc. setting section 16 is added to the control unit 6. If the destination etc. setting section 16 sets a destination and/or one or more en route locations, then the display name selecting section 13 selects the names of the en route locations and the destination as the distant map (telephoto) names to be displayed. The following omits the detailed explanation of parts that are the same as in the first embodiment, and focuses on characteristic parts of the present embodiment.

In view of the similarity between the third embodiments and the prior embodiments, the parts of the third embodiment that are identical to the parts of the prior embodiment will be given the same reference numerals as the parts of the prior embodiment. Moreover, the descriptions of the parts of the third embodiment that are identical to the parts of the prior embodiment may be omitted for the sake of brevity.

The destination etc. setting section 16 sets the en route locations and the destination in accordance with an input command, by voice or the like, by the user using the input unit 2. The en route locations and the destination requested by the user are then used for route searching by the in-vehicle navigation device 1" to determine a route for the vehicle to travel to the selected destination. In other words, if the input command by the user sent from the input unit 2 is analyzed and that input command instructs the setting of a destination, en route location(s) or the like, then the destination etc. setting section 16 sets the point specified by that input command as the en route location(s) or destination for route searching. If the destination etc. setting section 16 sets the en route location(s) and/or the destination, then a search is conducted for a recommended route from the departure point (given as the current position of the vehicle) to the destination via the set en route locations. However, in the in-vehicle navigation device 1" in which the third embodiment is applied, the information of the en route locations and the destination set by the destination etc. setting section 16 are sent to the display name selecting section 13.

If the map image setting section 11 determines the current displayed map image to be displayed, and the destination etc. setting section 16 sets the en route location(s) and/or destination, then the display name selecting section 13 selects as the intra-map names to be displayed just the appropriate number of names that have a high priority among the intra-map names included in the current displayed map image to be displayed, and selects as the distant map (telephoto) names to be displayed the destination and/or the en route location(s) at a position nearest the current position of the vehicle and that is a point not included in the map image to be displayed among the en route location(s) and the destination set by the destination etc. setting section 16. Thereby, the names of the en route location(s) and the destination surmised to be of high interest to the user are displayed on the current displayed map image, and become subject to an input command. If a command is input by a user that specifies these names of the en route location and the destination displayed on the current displayed map image, then a map image is newly displayed that indicates, based on the en route location(s) and/or the destination, the vicinity of the en route location(s) and/or the destination.

Furthermore, if the en route location(s) and/or the destination set by the destination etc. setting section 16 are all included in the current displayed map image to be displayed, then these names of current displayed cannot be selected as the telephoto names to be displayed. However, in such a case, it is also acceptable for the display name selecting section 13 to select distant map (telephoto) names using techniques the same as in the first embodiment or second embodiment, which are discussed above. In addition, even if the names of the en route location(s) and/or the destination set by the destination etc. setting section 16 are selected as the distant map (telephoto) names to be displayed, then it is also acceptable to use techniques which are the same as those in the above-discussed first and second embodiments in combination, and to select as the distant map (telephoto) names to be displayed a combination of the names of the en route location(s) and/or the destination and the distant map (telephoto) names included in the telephoto region.

The following explains one example of the processing of the control unit 6, wherein a display image is displayed on the display unit 5 in accordance with the input command of the user, in the in-vehicle navigation device 1 of the present embodiment as described above, referencing the flow chart of FIG. 14.

The processing from step S3-1 to step S3-4 is the same as the processing in the first embodiment discussed above (refer to FIG. 6). In the third embodiment, if the map image setting section 11 of the control unit 6 has determined the current displayed map image to be displayed in step S3-4, then the destination etc. setting section 16 of the control unit 6 next determines whether the en route location(s) and/or the destination for route searching has been set (step S3-5). Further, if the destination etc. setting section 16 has set the en route location(s) and/or the destination, then the display name selecting section 13 of the control unit 6 next selects the intra-map names to be displayed, and also selects as a distant map (telephoto) name to be displayed the name of one of the en route locations and/or the destination, among the set of the en route locations and the destination, that is located at a position closest to the current position of the vehicle and that is a point not included in the map image determined to be displayed (step S3-6).

However, if an en route location and a destination have not been set, then the telephoto distance setting section 12 of the control unit 6 sets the distant map (telephoto) names (step S3-7), and the display name selecting section 13 selects the intra-map names to be displayed as well as selects as the distant map (telephoto) names to be displayed the names in the telephoto region defined based on the set telephoto distance (step S3-8).

When the intra-map names and the distant map (telephoto) names to be displayed have been selected in step S3-6 or step S3-8, the display image creating section 14 of the control unit 6 next creates a display image, wherein the selected intra-map names and the distant map (telephoto) names are superimposed on the map image determined to be displayed (step S3-9). At this time, the intra-map names are displayed at points corresponding to locations of the relevant intra-map names on the map image, and the distant map (telephoto) names are displayed at the peripheral part of the map image corresponding to the bearing at which a point is positioned when that point, which is indicated by the relevant telephoto name, is viewed from the center of the map image.

When the display image creating section 14 has created the display image, the data of the created display image is sent to the display unit 5, the display unit 5 then performs a display operation based on this display image data, and the display image is then displayed on the display unit 5 (step S3-10). The intra-map names and the distant map (telephoto) names superimposed on the map image in the display image displayed on the display unit 5 become subject to the user's next input command.

While the abovementioned type of display image is displayed on the display unit 5, the control unit 6 continuously monitors whether there is a new input command from the user that specifies an intra-map name or distant map (telephoto) name superimposed on the map image (step S1-12). Further, if there is a new input command from the user that specifies an intra-map name or a distant map (telephoto) name, then processing returns to step S3-4, whereupon the map image setting section 11 determines to be newly displayed the map image that indicates, based on a name specified by the user, the vicinity of that specified name, subsequent processing is repeated, and a display image that superimposes the intra-map names and the distant map (telephoto) names on the map image determined to be newly displayed is displayed on the display unit 5.

However, if there is no new input command from the user that specifies an intra-map name or a distant map (telephoto) name superimposed on the map image, then the control unit 6 determines whether an operation that stops the in-vehicle navigation device 1″ was performed (step S3-12), and the above type of display image is continuously displayed on the display unit 5 until an operation to stop the in-vehicle navigation device 1″ is performed.

If it is determined in step S3-12 that an operation to stop the in-vehicle navigation device 1 was performed, then the data of the display image displayed on the display unit 5 is saved and the in-vehicle navigation device 1″ is subsequently stopped (step S3-13). Then, the series of processes ends.

As explained above, according to the in-vehicle navigation device 1″ of the present embodiment, if an en route location or destination is set for route searching, then the names of en route location and the destination surmised to be of high interest to the user are selected as the distant map (telephoto) names to be displayed, are displayed on the current displayed map image, and become available for selection by the user through an input command. Accordingly, the user can display a map image in the vicinity of these en route locations and the destination by just inputting a command that specifies the en route locations or destination displayed on the map image.

Furthermore, the above explained embodiments in which the present invention was applied to the in-vehicle navigation device 1, 1' or 1" installed on a vehicle in order to support the travel of the vehicle while displaying a map image. However, the present invention is not limited to the in-vehicle navigation device 1, 1' or 1", and can be effectively applied to any device provided with a function to display a map image. For example, even if the present invention is applied to a portable device, such as normal telephones and PDAs (Personal Digital Assistance), provided with a function that displays a map image, the map image of a location distant from the map image being displayed can be appropriately displayed with a simple operation, thereby improving the operational characteristics of these portable devices.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-304444. The entire disclosure of Japanese Patent Application No. 2002-304444 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A map image display device comprising:
    an input unit configured to input user commands;
    a display unit configured to display map images; and
    a control unit operatively coupled to the display unit to display on the display unit a current displayed map image with at least one user selectable distant map name corresponding to a distant location that is not located in the current displayed map image,
    said control unit being configured to switch from the current displayed map image to a new displayed map image in response to a user input command such that the new displayed map image represents an area including the distant location corresponding to the distant map name selected by the user input command, the control unit being further configured to display the distant map name on the display unit in a peripheral part of the display unit that corresponds to a relative direction of the distant location relative to a center point of the current displayed map image.

2. The map image display device as recited in claim 1, wherein the control unit is further configured to display on the display unit at least one intra-map name corresponding to a displayed location that is located in the current displayed map image.

3. A map image display device comprising:
    an input unit configured to input user commands;
    a display unit configured to display map images; and
    a control unit operatively coupled to the display unit to display on the display unit a current displayed map image with at least one user selectable distant map name corresponding to a distant location that is not located in the current displayed map image,
    said control unit being configured to switch from the current displayed map image to a new displayed map image in response to a user input command such that the new displayed map image represents an area including the distant location corresponding to the distant map name selected by the user input command,
    the control unit being further configured to include
        a map image setting section configured to determine the current displayed map image to be displayed;
        a telephoto distance setting section configured to set a telephoto distance to a prescribed distance that extends from a center point of the current displayed map image determined to be displayed by the map image setting section to a position not included in the current displayed map image to be displayed;
        a display name selecting section configured to select at least one intra-map name to be displayed corresponding to a location that is located in the current displayed map image, and to select the distant map name as a telephoto name to be displayed and that is included in a telephoto region that is not included in the current displayed map image, the telephoto region being based on a position distant from the center of the current displayed map image to be displayed by at least the telephoto distance that is set by the telephoto distance setting section; and
        a display image creating section configured to create a display image including the current displayed map image with the intra-map name and the distant map name that were selected by the display name selecting section such that the intra-map name is to be displayed at a location superimposed on the current displayed map image that corresponds to the intra-map name and the distant map name is to be superimposed at a position on the current displayed map image that corresponds to a relative direction of the distant location relative to the center point of the current displayed map image; the control unit being further configured to display the distant map name on the display unit in a peripheral part of the display unit.

4. The map image display device as recited in claim 3, wherein
    said telephoto distance setting section is further configured to set the telephoto distance in accordance with a scale of the current displayed map image to be displayed determined by the map image setting section.

5. The map image display device as recited in claim 3, wherein the map image display device is configured to be installed in a mobile body; and the telephoto distance setting section is further configured to vary the telephoto distance according to a moving speed of the mobile body.

6. The map image display device as recited in claim 3, wherein the map image display device is configured to be installed in a mobile body and further comprises a history information storing section configured to store a movement history of the mobile body; and said telephoto distance setting being further configured to calculate a telephoto distance setting value based on the movement history stored in the history information storing section, and to set the telephoto distance in accordance with the telephoto distance setting value calculated.

7. The map image display device as recited in claim 6, wherein said telephoto distance setting is further configured to calculate the telephoto distance setting value based on at least one of an average movement distance of the mobile body per day and an average maximum movement range of the mobile body stored in the history information storing section as the movement history, and to set the telephoto distance in accordance with the telephoto distance setting value calculated.

8. The map image display device as recited in claim 7, wherein said telephoto distance setting section is further configured to calculate the telephoto distance setting value on a daily basis for each day of a week and to set the telephoto distance in accordance with the telephoto distance setting value calculated that corresponds to a current day of the week in which the map image display device is used.

9. The map image display device as recited in claim 7, wherein said telephoto distance setting section is further configured to calculate the telephoto distance setting value on a seasonal basis for each season of a year and to set the telephoto distance in accordance with the telephoto distance setting value calculated that corresponds to a current season of the year in which the map image display device is used.

10. The map image display device as recited in claim 7, wherein said telephoto distance setting section is further configured to reduce the telephoto distance as a movement distance of the mobile body from a movement start position increases.

11. The map image display device as recited in claim 3, wherein the map image display device is configured to be installed in a mobile body; and the display name selecting section is further configured to select a distant map location as the distant map name to be displayed that is included in the telephoto region position in a direction of movement of the mobile body.

12. The map image display device as recited in claim 3, wherein the display name selecting section is further configured to select as the distant map name to be displayed that is type of location specified by a user's input command.

13. A map image display device comprising:

an input unit configured to input user commands;

a display unit configured to display map images; and a control unit operatively coupled to the display unit to display on the display unit a current displayed map image with at least one user selectable distant map name corresponding to a distant location that is not located in the current displayed map image, said control unit being configured to switch from the current displayed map image to a new displayed map image in response to a user input command such that the new displayed map image represents an area including the distant location corresponding to the distant map name selected by the user input command, the control unit being further configured to include a map image setting section configured to determine the current displayed map image to be displayed;

a destination setting section configured to set at least one of an en route location and a destination;

a display name selecting section configured to select at least one intra-map name to be displayed corresponding to a location that is located in the current displayed map image, and to select the distant map name as the at least one of the en route location and the destination to be displayed and that is located at a point that is not included in the current displayed map image; and a display image creating section configured to create a display image including the current displayed map image with the intra-map name and the at least one of the en route location and the destination that were selected by the display name selecting section such that the intra-map name is to be displayed at a location superimposed on the current displayed map image that corresponds to the intra-map name and the at least one of the en route location and the destination is to be superimposed at a position on the current displayed map image that corresponds to a relative direction of the distant location relative to the center point of the current displayed map image;

the control unit being further configured to display the distant map name on the display unit in a peripheral part of the display unit.

14. The map image display device as recited in claim 13, wherein said telephoto distance setting section is further configured to set the telephoto distance in accordance with a scale of the current displayed map image to be displayed determined by the map image setting section.

15. The map image display device as recited in claim 13, wherein the map image display device is configured to be installed in a mobile body; and the telephoto distance setting section is further configured to vary the telephoto distance according to a moving speed of the mobile body.

16. A map image display device comprising:

input means for inputting user commands;

display means for displaying map images; and control means for controlling the display means to display a current displayed map image with at least one user selectable distant map name corresponding to a distant location that is not located in the current displayed map image, and for switch from the current displayed map image to a new displayed map image in response to a user input command such that the new displayed map image represents an area including the distant location corresponding to the distant map name selected by the user input command, the control means further including a function for controlling the display means to display the distant map name on the display means in a peripheral part of the display means that corresponds to a relative direction of the distant location relative to a center point of the current displayed map image.

17. A map image display program embodied on a computer-readable medium having computer-executable components comprising:

a displaying program with instructions for displaying on a display unit a current displayed map image with at least one user selectable distant map name corresponding to a distant location that is not located in the current displayed map image, the displaying program further including instructions for displaying the distant map name on the display unit in a peripheral part of the display unit that corresponds to a relative direction of the distant location relative to a center point of the current displayed map image, and a switching program with instructions for switching from the current displayed map image to a new displayed map image in response to an input command such that the new displayed map image represents an area including the distant location corresponding to the distant map name selected by the input command.

18. A method for displaying map images comprising:

displaying on a display unit a current displayed map image with at least one user selectable distant map name corresponding to a distant location that is not located in the current displayed map image, displaying the distant map name on the display unit in a peripheral part of the display unit that corresponds to a relative direction of the distant location relative to a center point of the current displayed map image, and switching from the current displayed map image to a new displayed map image in response to an input command such that the new displayed map image represents an area including the distant location corresponding to the distant map name selected by the input command.

* * * * *